(12) United States Patent
Shen et al.

(10) Patent No.: US 11,115,339 B2
(45) Date of Patent: Sep. 7, 2021

(54) NETWORK CONGESTION CONTROL METHOD, DEVICE, AND SYSTEM

(71) Applicant: HUAWEI TECHNOLOGIES CO., LTD., Guangdong (CN)

(72) Inventors: Li Shen, Nanjing (CN); Wei Shen, Shenzhen (CN); Weiqing Kong, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 15 days.

(21) Appl. No.: 16/217,821

(22) Filed: Dec. 12, 2018

(65) Prior Publication Data

US 2019/0116126 A1   Apr. 18, 2019

Related U.S. Application Data

(63) Continuation of application No. PCT/CN2017/084627, filed on May 17, 2017.

(30) Foreign Application Priority Data

Jun. 13, 2016 (CN) .......................... 201610421670.X

(51) Int. Cl.
*H04L 12/825* (2013.01)
*H04L 12/721* (2013.01)
(Continued)

(52) U.S. Cl.
CPC ............ *H04L 47/263* (2013.01); *H04L 45/72* (2013.01); *H04L 47/11* (2013.01);
(Continued)

(58) Field of Classification Search
CPC ....... H04L 47/263; H04L 47/26; H04L 47/11; H04L 47/2483; H04L 47/626; H04L 47/12; H04L 2212/00
See application file for complete search history.

(56) References Cited

U.S. PATENT DOCUMENTS

| 9,197,568 B2 | 11/2015 | Ko et al. |
| 2006/0203730 A1* | 9/2006 | Zur ........................ H04L 47/263 370/235 |

(Continued)

FOREIGN PATENT DOCUMENTS

| CN | 102255790 A | 11/2011 |
| CN | 102255808 A | 11/2011 |

(Continued)

OTHER PUBLICATIONS

P. Calhoun et al., Diameter Base Protocol. RFC3588, Sep. 2003, 147 pages.

(Continued)

*Primary Examiner* — Min Jung

(74) *Attorney, Agent, or Firm* — Fish & Richardson P.C.

(57) ABSTRACT

Embodiments of the present invention provide a network congestion control method, a device, and a system. The method includes: receiving a first congestion control message, where the first congestion control message carries a 5-tuple of a packet that causes congestion; obtaining a flow identifier of the packet based on the 5-tuple of the packet that causes the congestion; generating a second congestion control message, where the second congestion control message carries the flow identifier corresponding to the 5-tuple; and sending the second congestion control message to a source node of the packet. In the embodiments of the present invention, a network congestion problem of a layer 3 IP network can be resolved.

14 Claims, 13 Drawing Sheets

(51) Int. Cl.
*H04L 12/801* (2013.01)
*H04L 12/851* (2013.01)
*H04L 12/863* (2013.01)

(52) U.S. Cl.
CPC .......... *H04L 47/2483* (2013.01); *H04L 47/26* (2013.01); *H04L 47/626* (2013.01); *H04L 2212/00* (2013.01)

(56) References Cited

U.S. PATENT DOCUMENTS

| | | |
|---|---|---|
| 2009/0052326 A1 | 2/2009 | Bergamasco et al. |
| 2013/0258847 A1* | 10/2013 | Zhang ..................... H04L 47/22 370/232 |
| 2013/0294244 A1* | 11/2013 | Fujita .................. H04W 28/021 370/235 |
| 2014/0233421 A1 | 8/2014 | Matthews |
| 2014/0254381 A1 | 9/2014 | Rácz et al. |
| 2014/0283030 A1* | 9/2014 | Moore ................ H04L 63/0236 726/22 |
| 2015/0381505 A1 | 12/2015 | Sundararaman et al. |
| 2016/0044530 A1* | 2/2016 | Cheng ............... H04W 28/0289 370/235 |
| 2016/0192233 A1* | 6/2016 | Sarker ................. H04L 47/2441 370/236 |
| 2016/0323116 A1* | 11/2016 | Garofalo ............. H04L 47/806 |
| 2016/0380884 A1* | 12/2016 | Sarikaya ................. H04W 8/08 370/389 |
| 2017/0041239 A1 | 2/2017 | Goldenberg et al. |
| 2017/0093699 A1* | 3/2017 | Crupnicoff .............. H04L 47/33 |
| 2017/0295100 A1* | 10/2017 | Hira .................... H04L 43/0864 |
| 2019/0288948 A1* | 9/2019 | Hira .................... H04L 43/0864 |

FOREIGN PATENT DOCUMENTS

| | | |
|---|---|---|
| CN | 102480471 A | 5/2012 |
| CN | 103907323 A | 7/2014 |
| CN | 104852855 A | 8/2015 |
| WO | 2014200406 A1 | 12/2014 |

OTHER PUBLICATIONS

International Search Report and Written Opinion issued in International Application No. PCT/CN2017/084627 dated Jul. 28, 2017, 21 pages.
Extended European Search Report issued in European Application No. 17812503.5 dated Mar. 7, 2019, 7 pages.
Bertz et al., "Diameter Congestion and Filter Attributes," Internet Engineering Task Force (IETF), RFC: 7660, ISSN: 1721, Oct. 2015, 9 pages.
IEEE Std 802.1 Qau-2010, "Virtual Bridged Local Area Networks; Amendment 13: Congestion Notification," IEEE Standard for Local and Metropolitan Area Networks, Apr. 23, 2010, 135 pages.
Liss [online], "Quantized Congestion Control (QCN) Experiences with Ethernet and RoCE," Mellanox Technologies, Open Fabric Alliance, 2013, 17 pages.
Office Action issued in Chinese Application No. 201610421670.X dated Jun. 3, 2020, 38 pages (with English translation).
EPO Communication pursuant to Article 94(3) EPC issued in European Application No. 17812503.5 dated Oct. 22, 2020, 5 pages.

* cited by examiner

NETWORK CONGESTION CONTROL METHOD, DEVICE, AND SYSTEM

CROSS-REFERENCE TO RELATED APPLICATIONS

This application is a continuation of International Application No. PCT/CN2017/084627, filed on May 17, 2017, which claims priority to Chinese Patent Application No. 201610421670.X, filed on Jun. 13, 2016, The disclosures of the aforementioned applications are hereby incorporated by reference in their entireties.

TECHNICAL FIELD

The present invention relates to the field of network communications technologies, and in particular, to a network congestion control method, a device, and a system.

BACKGROUND

In the prior art, when a node in a network detects network congestion, the node sends a congestion notification message (Congestion Notification Message, CNM) to a source node that sends a packet, and requests the source node to reduce a packet sending rate. After receiving the CNM, the source node that sends the packet reduces the packet sending rate, and periodically attempts to increase the packet sending rate. If the congestion is cleared at this moment, increasing the packet sending rate will not cause congestion, and a CNM will not be received either. The packet sending rate can be finally restored to a value before the congestion.

However, there is a technical problem in this technical solution: The node that detects the network congestion needs to encapsulate, into the CNM, a flow identifier (Flow Identifier, Flow-ID) carried in the packet that causes the congestion, and needs to set a destination Media Access Control (Media Access Control, MAC) address in the CNM as a source MAC address of the packet that causes the congestion. In this way, it can be ensured that the CNM can be sent to the source node. The source node determines, based on the Flow-ID, to limit a rate of a packet that has the Flow-ID. The foregoing CNM mechanism can be used only in a layer 2 Ethernet (Ethernet) network, because in a layer 3 Internet Protocol (Internet Protocol, IP) network, a packet header is replaced at each routing, and the Flow-ID as well as the source MAC address of the source node is lost. Therefore, a subsequent node cannot construct a CNM and send the CNM to the source node. Therefore, the CNM mechanism cannot support the layer 3 IP network.

SUMMARY

In view of this, it is necessary to provide a network congestion control method, a device, and a system, so as to resolve a network congestion problem of a layer 3 IP network.

According to a first aspect, a network congestion control method is provided, including: when network congestion is detected, obtaining a 5-tuple of a packet that causes the network congestion; generating a congestion control message, where the congestion control message carries the 5-tuple of the packet; and sending the congestion control message to a source node of the packet or an access forwarding device connected to a source node of the packet.

In a possible design, the method further includes: determining a type of the source node of the packet.

In another possible design, the type of the source node of the packet is determined by using one of the following fields: a device type field, a priority field, or a source IP address field.

In a possible design, the 5-tuple of the packet is encapsulated in a payload field of the congestion control message.

In another possible design, a destination address of the congestion control message is an Internet Protocol IP address of the source node of the packet, or an IP address of the access forwarding device connected to the source node of the packet.

In another possible design, the congestion control message further carries information used to indicate a congestion degree.

In another possible design, the information used to indicate a congestion degree includes one or more pieces of the following information: a quantized feedback value of the congestion control message, a congestion point identifier, a current quantity of available bytes of a congestion point sending queue, or a difference between two quantities of available bytes of a congestion point sending queue.

In another possible design, the 5-tuple is a source IP address, a destination IP, a source port number, a destination port number, and a protocol type carried in the packet.

According to another aspect, a network congestion control method is further provided, including: receiving a first congestion control message, where the first congestion control message carries a 5-tuple of a packet that causes congestion; obtaining a flow identifier of the packet based on the 5-tuple of the packet that causes the congestion; generating a second congestion control message, where the second congestion control message carries the flow identifier of the packet; and sending the second congestion control message to a source node of the packet.

In a possible design, the method further includes: receiving one or more packets from the source node; and establishing a mapping relationship between a 5-tuple and a flow identifier for the one or more packets.

In another possible design, the packet is a data frame, the data frame carries a CN-TAG field, and the flow identifier is carried in an RPID field of the CN-TAG field.

In another possible design, the second congestion control message is a congestion notification message, the congestion notification message carries a CN-TAG field, and the flow identifier is carried in an RPID field of the CN-TAG field.

In another possible design, the first congestion control message further carries information used to indicate a congestion degree.

In another possible design, the information used to indicate a congestion degree includes one or more pieces of the following information: a quantized feedback value of the congestion control message, a congestion point identifier, a current quantity of available bytes of a congestion point sending queue, or a difference between two quantities of available bytes of a congestion point sending queue.

In another possible design, the 5-tuple is a source IP address, a destination IP, a source port number, a destination port number, and a protocol type carried in the packet.

According to another aspect, a network congestion control method is further provided, including: receiving one or more packets from a source node; establishing a mapping relationship between a 5-tuple and a flow identifier for the one or more packets; when network congestion is detected, obtaining a 5-tuple of a packet that causes the congestion; obtaining, based on the mapping relationship, a flow identifier of the packet that causes the congestion; and generating a congestion control message, and sending the congestion control message to the source node of the packet, where the congestion control message carries the flow identifier.

In a possible design, the method further includes: determining a type of the source node of the packet.

In another possible design, the type of the source node of the packet is determined by using one of the following fields: a device type field, a priority field, or a source IP address field.

In another possible design, the packet is a data frame, the data frame carries a CN-TAG field, and the flow identifier is carried in an RPID field of the CN-TAG field.

In another possible design, the congestion control message is a congestion notification message, the congestion notification message carries a CN-TAG field, and the flow identifier is carried in an RPID field of the CN-TAG field.

In another possible design, the congestion control message further carries information used to indicate a congestion degree.

In another possible design, the information used to indicate a congestion degree includes one or more pieces of the following information: a quantized feedback value of the congestion control message, a congestion point identifier, a current quantity of available bytes of a congestion point sending queue, or a difference between two quantities of available bytes of a congestion point sending queue.

In another possible design, the 5-tuple is a source IP address, a destination IP, a source port number, a destination port number, and a protocol type carried in the packet.

According to another aspect, a network congestion control method is further provided, including: receiving a plurality of packets from a source node; when network congestion is detected, generating a CNP message; and sending the CNP message to the source node, to instruct the source node to reduce a data rate.

In a possible design, the packet is a RoCE packet.

In another possible design, the packet carries a flow identifier, and the flow identifier is encapsulated in a BTH field of the packet.

In another possible design, the flow identifier is encapsulated in a DestQP field of the packet.

In another possible design, the CNP message carries a flow identifier, and the flow identifier is encapsulated in a BTH field of the CNP message.

In another possible design, the CNP message carries a flow identifier, and the flow identifier is encapsulated in a DestQP field of the CNP message.

In another possible design, the method further includes: determining a type of the source node.

In another possible design, the type of the source node is determined by using one of the following fields: a device type field, a priority field, or a source IP address field.

In another possible design, the type of the source node is a RoCEv2 server.

In another possible design, a destination address of the CNP message is an address of the RoCEv2 server.

According to another aspect, a network device is further provided, including: a processing unit, configured to: when network congestion is detected, obtain a 5-tuple of a packet that causes the network congestion; and generate a congestion control message, where the congestion control message carries the 5-tuple of the packet; and a sending unit, configured to send the congestion control message to a source node of the packet or an access forwarding device connected to a source node of the packet.

In a possible design, the processing unit is further configured to determine a type of the source node of the packet.

In another possible design, the type of the source node of the packet is determined by using one of the following fields: a device type field, a priority field, or a source IP address field.

In another possible design, the 5-tuple of the packet is encapsulated in a payload field of the congestion control message.

In another possible design, a destination address of the congestion control message is an Internet Protocol IP address of the source node of the packet, or an IP address of the access forwarding device connected to the source node of the packet.

In another possible design, the congestion control message further carries information used to indicate a congestion degree.

In another possible design, the information used to indicate a congestion degree includes one or more pieces of the following information: a quantized feedback value of the congestion control message, a congestion point identifier, a current quantity of available bytes of a congestion point sending queue, or a difference between two quantities of available bytes of a congestion point sending queue.

According to another aspect, a network device is further provided, including: a receiving unit, configured to receive a first congestion control message, where the first congestion control message carries a 5-tuple of a packet that causes congestion; a processing unit, configured to: obtain a flow identifier of the packet based on the 5-tuple of the packet that causes the congestion; and generate a second congestion control message, where the second congestion control message carries the flow identifier; and a sending unit, configured to send the second congestion control message to a source node of the packet.

In a possible design, the receiving unit is further configured to receive one or more packets from the source node.

In another possible design, the processing unit is further configured to establish a mapping relationship between a 5-tuple and a flow identifier for the one or more packets.

In another possible design, the network device further includes a storage unit, configured to store a table of a mapping relationship between a 5-tuple and a flow identifier for the packets.

In another possible design, the packet is a data frame, the data frame carries a CN-TAG field, and the flow identifier is carried in an RPID field of the CN-TAG field.

In another possible design, the second congestion control message is a congestion notification message, the congestion notification message carries a CN-TAG field, and the flow identifier is carried in an RPID field of the CN-TAG field.

In another possible design, the first congestion control message further carries information used to indicate a congestion degree.

In another possible design, the information used to indicate a congestion degree includes one or more pieces of the following information: a quantized feedback value of the congestion control message, a congestion point identifier, a current quantity of available bytes of a congestion point sending queue, or a difference between two quantities of available bytes of a congestion point sending queue.

According to another aspect, a network device is further provided, including: a receiving unit, configured to receive one or more packets from a source node; a storage unit, configured to store a mapping relationship between a 5-tuple and a flow identifier for the one or more packets; a processing unit, configured to: when network congestion is detected, obtain a 5-tuple of a packet that causes the congestion; obtain, based on the mapping relationship, a flow identifier corresponding to the packet; and generate a congestion control message, where the congestion control message carries the flow identifier; and a sending unit, configured to send the congestion control message to the source node of the packet that causes the congestion, so that the source node reduces a packet transmission rate based on the congestion control message.

In a possible design, the processing unit is further configured to determine a type of the source node of the packet.

In another possible design, the type of the source node of the packet is determined by using one of the following fields: a device type field, a priority field, or a source IP address field.

In another possible design, the packet is a data frame, the data frame carries a CN-TAG field, and the flow identifier is carried in an RPID field of the CN-TAG field.

In another possible design, the congestion control message is a congestion notification message, the congestion notification message carries a CN-TAG field, and the flow identifier is carried in an RPID field of the CN-TAG field.

In another possible design, the congestion control message further carries information used to indicate a congestion degree.

According to another aspect, a network device is further provided, including: a receiving unit, configured to receive one or more packets from a source node; a processing unit, configured to generate a CNP message when network congestion is detected; and a sending unit, configured to send the CNP message to the source node, to instruct the source node to reduce a data rate.

In a possible design, the processing unit is further configured to determine a type of the source node.

In another possible design, the type of the source node is determined by using one of the following fields: a device type field, a priority field, or a source IP address field.

In another possible design, the type of the source node is a RoCEv2 server.

In another possible design, the CNP message carries a flow identifier.

In another possible design, a destination address of the CNP message is an IP address of the RoCEV2 server.

According to another aspect, a network system is further provided, including a source node, an access forwarding device, an aggregation device, and a destination node, where the source node is connected to one port of the access forwarding device, another port of the access forwarding device is connected to the aggregation device, and another port of the aggregation device is indirectly connected to the destination node; the source node is configured to send a plurality of packets to the access forwarding device; the access forwarding device is configured to: receive the plurality of packets, obtain 5-tuples and flow identifiers of the packets, establish a mapping relationship between the 5-tuples and the flow identifiers, and forward the plurality of packets to the aggregation device; the aggregation device is configured to: when network congestion is detected, obtain a 5-tuple of a packet that causes the network congestion, and generate a first congestion control message, where the first congestion control message carries the 5-tuple; and send the first congestion control message to the access forwarding device; the access forwarding device is further configured to: receive the first congestion control message to obtain the 5-tuple; obtain a flow identifier based on the 5-tuple; generate a second congestion control message, where the second congestion control message carries the flow identifier; and send the second congestion control message to the source node; and the source node is configured to receive the second congestion control message and reduce, based on an indication of the control message, a rate of a packet that has the flow identifier.

According to another aspect, a network system is further provided, including a source node, an access forwarding device, an aggregation device, and a destination node, where the source node is connected to one port of the access forwarding device, another port of the access forwarding device is connected to the aggregation device, and another port of the aggregation device is indirectly connected to the destination node; the source node is configured to send a plurality of packets to the access forwarding device; the access forwarding device is configured to: receive the plurality of packets, obtain 5-tuples and flow identifiers of the packets, and establish a mapping relationship between the 5-tuples and the flow identifiers; when network congestion is detected, obtain a 5-tuple of a packet that causes the network congestion, and obtain, based on the 5-tuple of the packet that causes the network congestion, a flow identifier of the packet that causes the congestion; generate a congestion control message, where the congestion control message carries the flow identifier of the packet that causes the congestion; and send the congestion control message to the source node; and the source node is further configured to: receive the congestion control message, and reduce, based on an indication of the congestion control message, a rate of a packet that has the flow identifier.

According to another aspect, a network system is further provided, including a source node, an intermediate node device, and a destination node, where the source node is connected to the destination node through the intermediate node device; the source node is configured to send a plurality of packets to the intermediate node device; the intermediate node device is configured to: when network congestion is detected, generate a CNP message, where the CNP message carries a flow identifier of a packet that causes the congestion; and send the CNP message to the source node; and the source node is further configured to: receive the CNP message, and reduce, based on an indication of the CNP message, a rate of a packet that has the flow identifier.

The 5-tuple mentioned in the embodiments of the present invention is a source IP address, a source port, a destination IP address, a destination port, and a transport layer protocol.

In the technical solutions provided in the embodiments of the present invention, when congestion is detected in a network, the 5-tuple of the packet that causes the network congestion is obtained, the flow identifier of the packet that causes the network congestion is obtained based on information about the 5-tuple, and then a congestion control message is generated and is sent to the source node of the packet, to instruct the source node to reduce a rate of a packet that has the flow identifier. The technical solutions may be applied to a layer 3 network.

DESCRIPTION OF EMBODIMENTS

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described in the following are merely some but not all of the embodiments of the present invention. All other embodiments obtained by a person skilled in the art based on the embodiments of the present invention shall fall within the protection scope of the present invention.

In the specification, claims, and accompanying drawings of the present invention, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present invention. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, product, or device.

Figure 1:
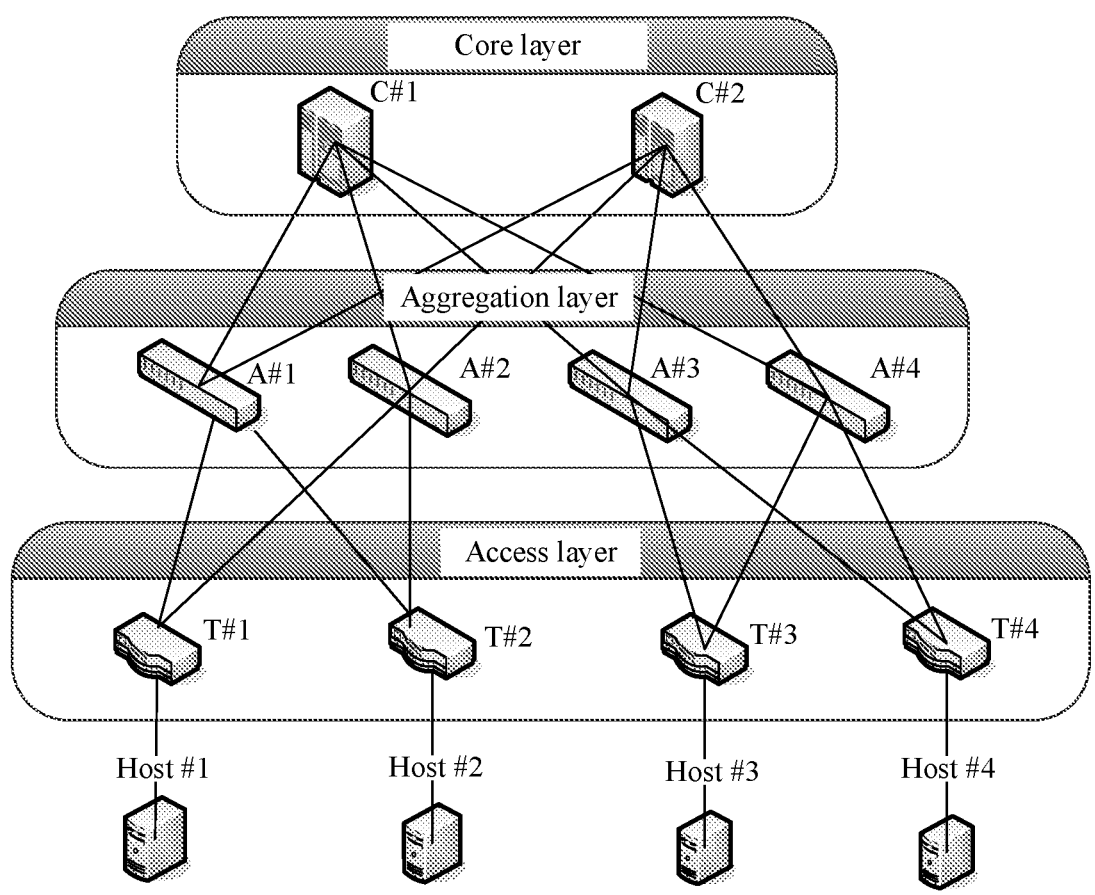
FIG. 1 is a schematic diagram of a network architecture according to an embodiment of the present invention.

The technical solutions in the embodiments of the present invention may be applied to a network architecture shown in FIG. 1. The network architecture includes an access layer, an aggregation layer, and a core layer. A source node (hosts 1 to 4 in FIG. 1) that sends a packet is connected to an access layer device (four devices in FIG. 1 are merely examples, and an actual quantity of devices in networking may be increased or decreased) through a copper twisted pair cable or an optical fiber, the access layer device (also referred to as an access forwarding device) is connected to an aggregation layer device (four devices in FIG. 1 are merely examples, and an actual quantity of devices in networking may be increased or decreased) through a copper twisted pair cable or an optical fiber, and the aggregation layer device is connected to a core layer device (two devices in FIG. 1 are merely examples, and an actual quantity of devices in networking may be increased or decreased) through a copper twisted pair cable or an optical fiber.

For ease of description, a node that sends a packet is collectively referred to as a source node (for example, the host 1). A node at which data finally arrives is referred to as a destination node (for example, the host 3). Nodes through which data passes are referred to as an access forwarding device (for example, T1 to T4 in FIG. 1), an aggregation device (for example, A1 to A4 in FIG. 1), and a core network device (for example, C1 to C2 in FIG. 1). For example, the host 1 serving as a source node sends a packet to the host 2 serving as a destination node, and the packet sequentially passes through the node T1, the node A1, and the node T2, and arrives at the node of the host 2. For another example, the host 1 serving as a source node sends a packet to the host 3 serving as a destination node, and the packet passes through the following nodes: The host 1 sends the packet to the node T1, the node T1 forwards the packet to the node A1, the node A1 forwards the packet to a node C1, the node C1 forwards the packet to a node A3, the node A3 forwards the packet to the node T3, and the packet finally arrives at the node of the host 2. It should be understood that a routing algorithm is used to calculate an optimized and shortest path between two nodes. To be specific, if there are a plurality of paths between the two nodes, the shortest path is usually selected.

Usually, in a data center (Data Center, DC) network, there are three types of data flows: (1) a storage data flow that requires no packet loss; (2) a high-performance computational flow that requires a low delay; and (3) an Ethernet flow that allows a particular packet loss and delay. Because of different requirements for the data flows, a conventional data center uses three different types of networks to carry different flows. This method is still acceptable in a small data center. However, with expansion of a data center scale, running three different types of networks is not an economical solution. An optional method is using a same Ethernet to carry three different types of data flows, and defining an additional mechanism, so that the Ethernet can meet the requirements for three different types of networks. Therefore, the Institute of Electrical and Electronics Engineers (Institute of Electrical and Electronics Engineers, IEEE) defines the following specifications: (1) Enhanced Transmission Selection (Enhanced Transmission Selection, ETS): used to prevent a burst of large-scale traffic of one type of data flow from affecting another type of data flow, so as to provide a minimum bandwidth guarantee for different types of data flows. For one type of data flow, extra bandwidth in addition to allocated bandwidth can be used only when bandwidth of another type of data flow is not occupied. In this way, a plurality of types of data flows may harmoniously coexist in a same network. (2) Priority-based Flow Control (Priority-based Flow Control, PFC): used to meet the following requirements: When three types of traffic coexist in an Ethernet, there is no packet loss for storage traffic, and there is no impact on the other two types of traffic. (3) Quantized Congestion Notification (Quantized Congestion Notification, QCN): used to reduce a packet sending rate of a source node that causes congestion, to avoid congestion at source, so as to maintain a smooth network, and resolve a problem of a packet delay increase caused by congestion-caused packet retransmission or flow control. An operating principle is as follows: The QCN is one of "additional mechanisms", and is used to avoid network congestion, so as to reduce a packet loss and reduce a network delay (congestion may cause a packet loss, and retransmission after the packet loss may increase the packet delay). To avoid network congestion, both an Ethernet switch and a source node (usually referred to as a server in a data center) need to support the QCN: When congestion is detected, the Ethernet switch sends a congestion notification message to a data source node, to request the data source node to reduce a packet sending rate. After receiving the congestion notification message, the data source node reduces the packet sending rate.

It should be noted that there are at least two types of source nodes: a first-type server and a second-type server. A plurality of embodiments in the following respectively correspond to three scenarios: In a first scenario, all hosts 1 to 4 in FIG. 1 are of the first type; in a second scenario, all hosts 1 to 4 in FIG. 1 are of the second type; in a third scenario, types of hosts in FIG. 1 include the first type and the second type.

Embodiment 1

Figure 2:
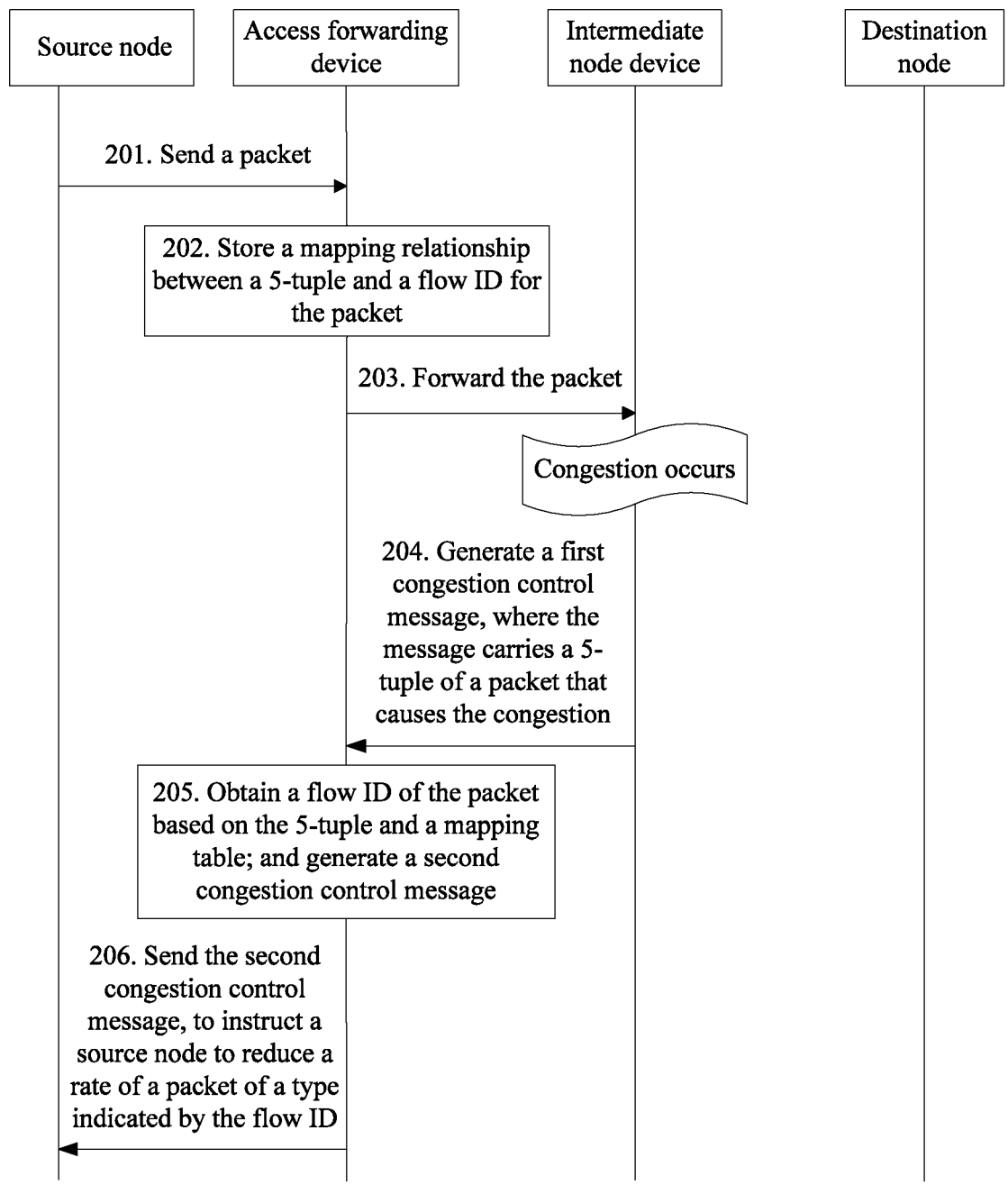
FIG. 2 is a schematic interaction diagram of a network congestion control method according to an embodiment of the present invention.

In a network architecture shown in FIG. 1, for example, a source node host 1 needs to send a packet to a destination node host 2, and the packet sequentially passes through an access forwarding device T1, an aggregation layer device A1, and an access layer device T2, and finally arrives at the host 2. If network congestion occurs in the intermediate node A1, FIG. 2 shows a schematic interaction diagram of a network congestion control method. The method includes the following steps.

Step 201: The source node host 1 sends a plurality of packets to the access forwarding device.

Figure 3A:
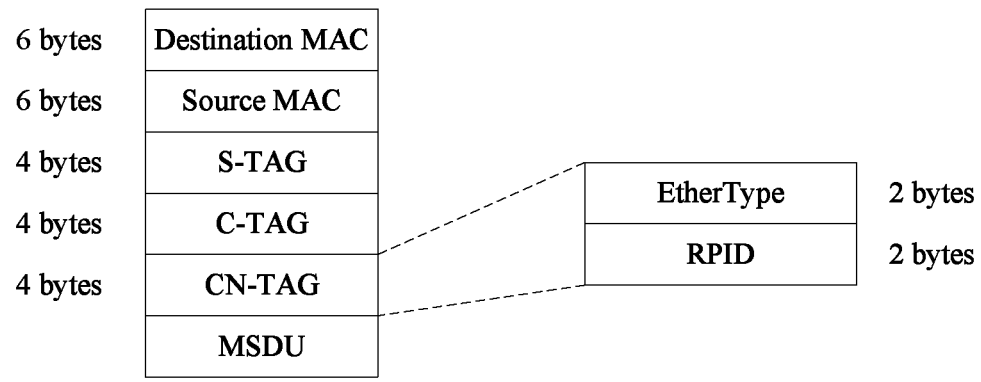
FIG. 3A is a schematic structural diagram of a packet (data packet) according to an embodiment of the present invention.
Figure 3B:
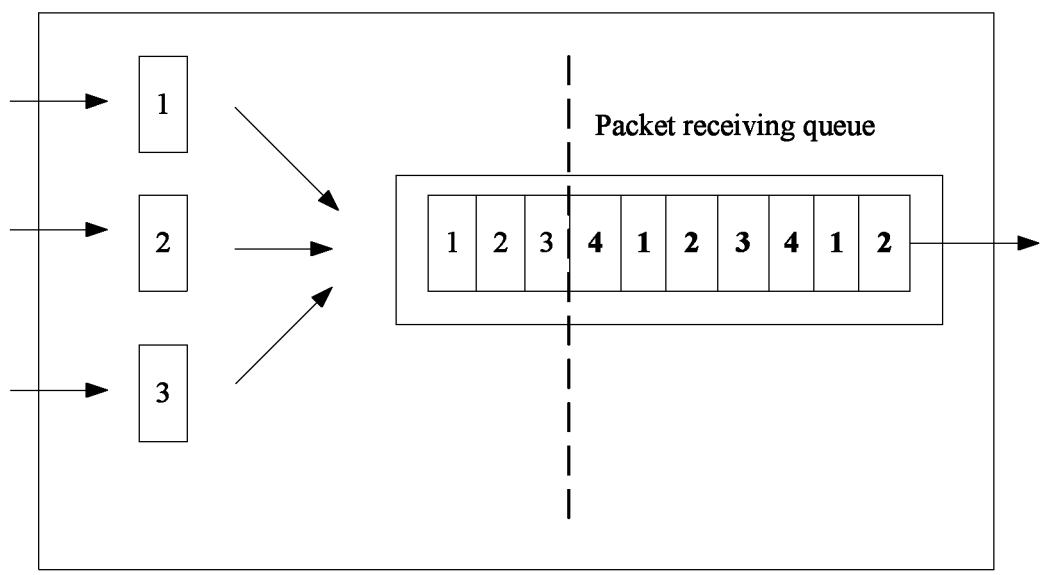
FIG. 3B is a schematic diagram of a method for detecting network congestion according to an embodiment of the present invention.

Specifically, the packet may also be referred to as a data packet, a frame, or the like. A format of the packet is shown in FIG. 3A, and includes a destination MAC address, a source MAC address, a service tag (Service VLAN Tag, S-TAG) field, a customer tag (Customer VLAN Tag, C-TAG) field, a congestion notification tag (Congestion Notification Tag, CN-TAG) field, and a Media Access Control service data unit (MAC Service Data Unit, MSDU) field. Information about a 5-tuple of the packet is encapsulated in the MSDU field, and the CN-TAG field further includes an EtherType (EtherType) field and a reaction point identifier (Reaction Point Identifier, RPID) field.

A flow identifier (Flow-ID) of the packet is encapsulated in the RPID field and is used to uniquely identify a type of a data flow of each sent packet. For example, if the Flow-ID is 1, it indicates that the packet belongs to a storage data flow; if the Flow-ID is 2, it indicates that the packet belongs to a high-performance computational flow; if the Flow-ID is 3, it indicates that the packet belongs to an Ethernet flow.

It should be understood that the 5-tuple is a source IP address, a destination IP, a source port number, a destination port number, and a protocol type carried in the packet.

When the packet is sent from the host 1 to the access forwarding device, the source MAC address is a MAC address of the host 1, the destination MAC address is a MAC address of the access forwarding device, the source IP address is an IP address of the host 1, and the destination IP address is an IP address of the host 2.

Step 202: After receiving the plurality of packets, the access forwarding device obtains a 5-tuple of each packet and information about a flow identifier, and locally stores a table of a mapping relationship between a 5-tuple of a packet and a flow identifier, for example, as shown in Table 1.

TABLE 1

| Source IP | Destination IP | Source port | Destination port | Protocol | Flow identifier |
|---|---|---|---|---|---|
| 192.168.2.100 | 192.168.3.30 | 5678 | 21 | 6 | 0xa878 |
| 10.1.10.2 | 10.2.20.1 | 8957 | 21 | 6 | 0xc9a0 |
| 192.168.2.100 | 10.3.50.1 | 2345 | 80 | 6 | 0x0ac9 |
| 200.1.2.3 | 100.2.3.4 | 2567 | 47 | 17 | 0x37a0 |

In Table 1, a value 6 in the "Protocol" column indicates that the protocol is the Transmission Control Protocol (Transmission Control Protocol, TCP), and a value 17 indicates that the protocol is the User Data Protocol (User Data Protocol, UDP).

Optionally, Table 1 may further store other information, for example, a virtual local access network (Virtual Local Access Network, VLAN) tag and a source MAC address, as shown in Table 2. During subsequent construction of a congestion notification message (Congestion Notification Message, CNM), the VLAN tag and the source MAC address need to be filled in a corresponding field of the CNM.

TABLE 2

| Source IP | Destination IP | Source port | Destination port | Protocol | Flow identifier | Source MAC | VLAN tag |
|---|---|---|---|---|---|---|---|
| 192.168.2.100 | 192.168.3.30 | 5678 | 21 | 6 | 0xa878 | 0x01a4f5aefe | 100 |
| 10.1.10.2 | 10.2.20.1 | 8957 | 21 | 6 | 0xc9a0 | 0xfd16783acd | 1024 |
| 192.168.2.100 | 10.3.50.1 | 2345 | 80 | 6 | 0x0ac9 | 0x0a25364101 | 3 |
| 200.1.2.3 | 100.2.3.4 | 2567 | 47 | 17 | 0x37a0 | 0xed16d8ea0a | 90 |

Step 203: The access forwarding device forwards the plurality of packets to the aggregation layer device.

It should be understood that a manner specified in the prior art may be used to forward the packet to a next device. For example, a routing table is queried to obtain an egress port and a next hop, and a MAC address corresponding to the next hop is queried based on an Address Resolution Protocol (Address Resolution Protocol, ARP) table to encapsulate an Ethernet header. An IP address and a port number of the next device may be encapsulated in a header of the packet, so that the packet may be routed to the next device.

Step 204: When detecting that network congestion occurs, the aggregation layer device obtains a 5-tuple of a packet that causes the congestion; generates a first congestion control message, where the first congestion control message carries the 5-tuple of the packet that causes the congestion; and sends the first congestion control message to the access forwarding device.

It should be noted that in a network device, a packet received from one port may be temporarily stored in a memory queue, and then the packet is sequentially taken out from the queue and forwarded to another port. The network congestion indicates, in the network device, that the packet in the queue exceeds a threshold. The obtaining a 5-tuple of a packet that causes the congestion, mentioned in step 204 in this embodiment of the present invention means, when the packet in the queue exceeds the threshold, obtaining a 5-tuple of a newly received packet.

Step 205: After receiving the congestion control message, the access forwarding device obtains the 5-tuple of the packet that causes the congestion and that is carried in the congestion control message; obtains, based on the table of a mapping relationship between a 5-tuple and a flow identifier, a flow identifier of the packet that causes the congestion; and generates a second congestion control message, where the second congestion control message carries the flow identifier.

Step 206: Send the second congestion control message to the host 1, to instruct the host 1 to reduce a rate of a packet that has the flow identifier.

Optionally, the first congestion control message may be a customized message. A format of the message is shown in Table 3.

TABLE 3

| IP header | UDP header | Payload |
|---|---|---|

As shown in Table 3, a customized first congestion control message packet includes at least a 20-byte IP header, an 8-byte UDP header, and a payload field. A structure of the 20-byte IP header includes: a version (Version) field, which has four bits and specifies a version number of the IP protocol; a header length (IP Header Length, IHL) field, which has four bits and specifies a length of the IP protocol header; a type of service (Type of service) field, which defines a processing method of an IP protocol packet; an IP packet total length (Total Length) field, an identifier (Identification) field, a tag (Flags) field, and a fragment offset (Fragment offset) field, which is connected to more fragments (More Fragments, MF) during data packet segmentation, to help a destination host to combine segmented packets; a time to live (Time to live, TTL) field, which indicates how long a data packet lives in a network, where when the data packet passes through a router, the value is reduced by 1, and when the value is 0, the data packet is discarded by the router; a protocol (Protocol) field, which has eight bits and indicates a protocol type used by a data part in an IP data packet; a header checksum (Header Checksum) field, which has 16 bits and is a checksum of an IPv4 data packet header; a source address (Source address) field; and a destination address (Destination Address) field. For details about meanings of these fields, refer to records in the existing Request for Comments (Request For Comments, RFC) 791 standard. Details are not described herein. A structure of the 8-byte UDP header includes a source port (Source Port) field, a destination port (Destination port) field, a length (Length) field, and a checksum (CheckSum) field. For details about meanings of these fields, refer to records in the existing Request for Comments (Request For Comments, RFC) 791 standard. Details are not described herein.

A source IP address of the IP header is an IP address of the congested aggregation device. The destination IP address is an IP address of the access forwarding device. A destination port number of the UDP header is used to identify the first congestion control message. For example, 0x2000 is defined as a destination port number. After receiving the first congestion message, the access forwarding device reads the field of the destination port number, and if a value is 0x2000, it indicates that the received message is a customized congestion control message and needs to be converted into a standard CNM in a next step. The 5-tuple of the packet that causes the congestion is encapsulated in a payload part.

Figure 4A:
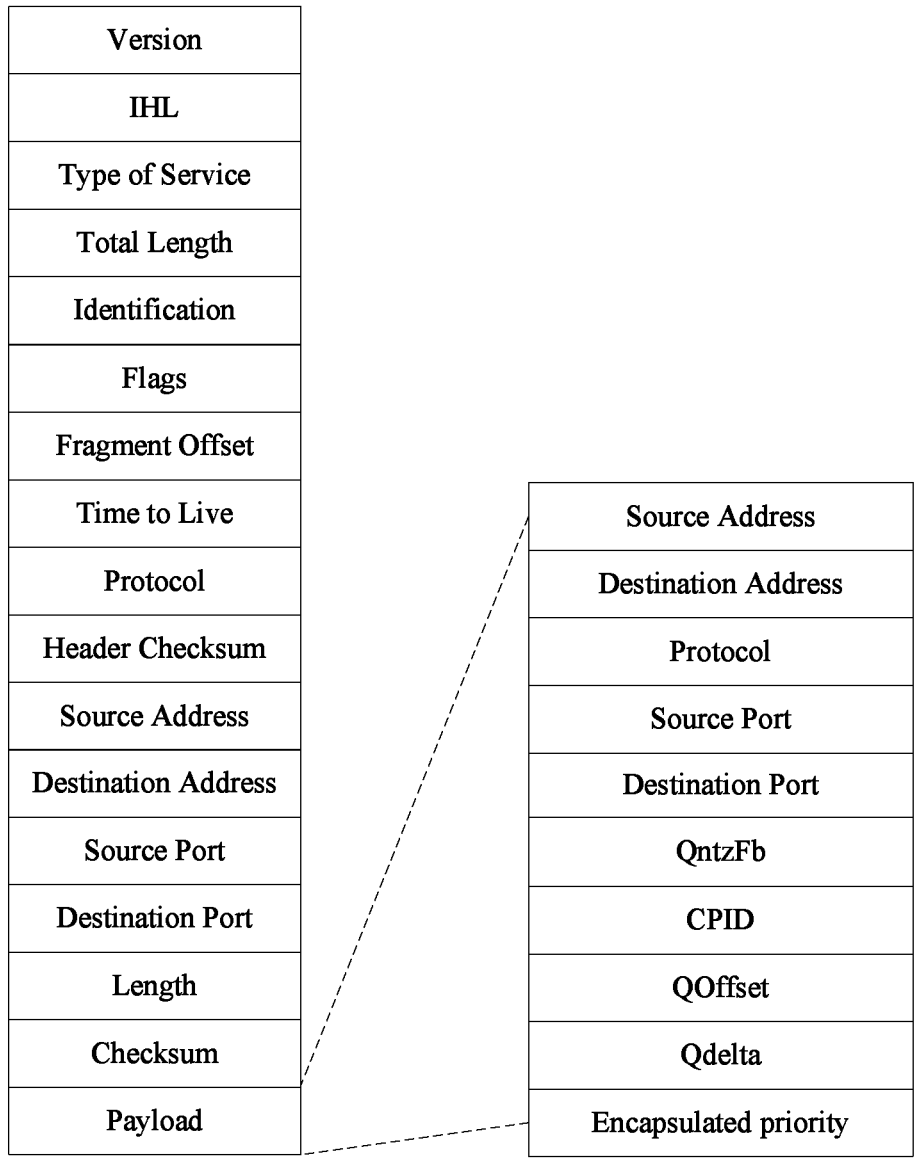
FIG. 4A is a schematic structural diagram of a CNM frame format according to an embodiment of the present invention.

Optionally, fields used to indicate a congestion degree, for example, a QntzFb field, a congestion point identifier (Congestion Point Identifier, CPID) field, a Qoffset (Qoffset) field, and a Qdelta field, are further encapsulated in the payload part. For example, the first congestion control message may be shown in FIG. 4A. A QntzFb field identifier is a quantized feedback value of the first congestion control message, has a length of six bits, and occupies six least-significant bits of the first two bytes. The CPID field indicates a congestion point identifier, and has a length of eight bytes. To ensure uniqueness of the identifier, a MAC address of a congestion point device is used as six most-significant bytes. Two least-significant bytes are used to identify different ports or different priority queues of a same device. The Qoffset field occupies two bytes, and indicates a current quantity of available bytes of a congestion point CP sending queue. The Qdelta field occupies two bytes, and indicates a difference between two quantities of available bytes of a congestion point CP sending queue.

Figure 4B:
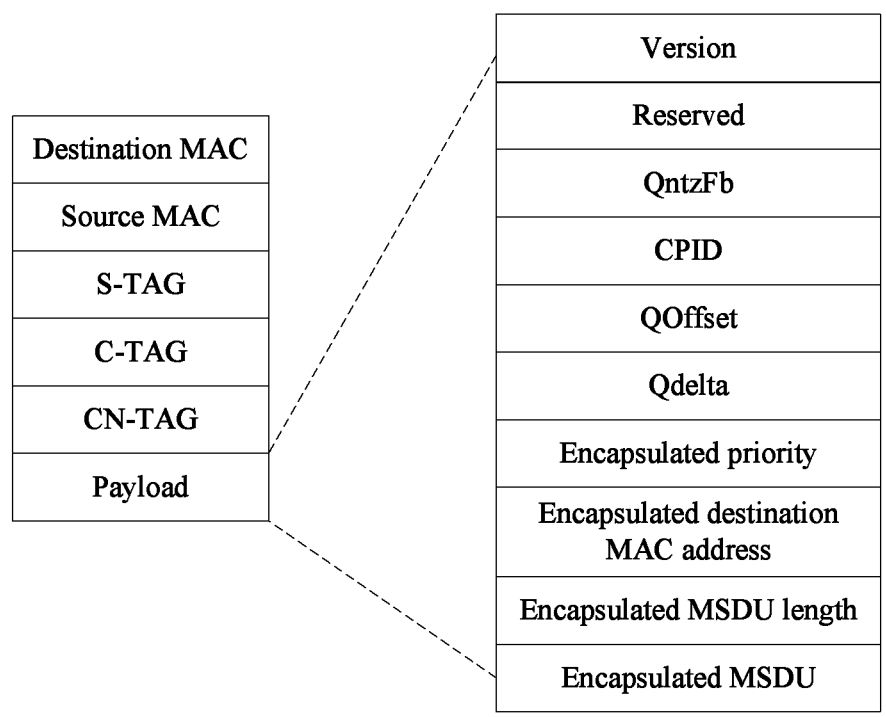
FIG. 4B is a schematic structural diagram of another CNM frame format according to an embodiment of the present invention.

Optionally, for the second congestion control message, refer to an existing CNM format. As shown in FIG. 4B, a format of the second congestion control message includes a destination IP address, a source IP address, an S-TAT, a C-TAG a CN-TAG and a payload. The payload further includes fields such as Version, Reserved, QntzFb, CPID, Qoffset, Qdelta, Encapsulated Priority, Encapsulated Destination MAC address, Encapsulated MSDU length, and Encapsulated MSDU. Version is a version number of the CNM message, has a length of four bits, and occupies four most-significant bits of the first byte, and a default value is filled with zeros. Reserved is a reserved field of the CNM message, has a length of six bits, and occupies four least-significant bits of the first byte and two most-significant bits of the second byte, and a default value is filled with zeros. QntzFB is a quantized feedback value of the CNM message, has a length of six bits, and occupies six least-significant bits of the first two bytes. Congestion Point Identifier (CPID) is a congestion point identifier, and has a length of eight bytes. To ensure uniqueness of the identifier, a MAC address of a congestion point device is used as six most-significant bytes. Two least-significant bytes are used to identify different ports or different priority queues of a same device. QOffset occupies two bytes, and indicates a current quantity of available bytes of a congestion point CP sending queue. QDelta occupies two bytes, and indicates a difference between two quantities of available bytes of a congestion point CP sending queue. Encapsulated priority occupies two bytes, three most-significant bits of the first byte are filled with a priority of a data frame that triggers a CNM message, and other bits are filled with zeros. Encapsulated destination MAC address occupies six bytes, and is filled with a destination MAC address of a data frame that triggers a CNM message. Encapsulated MSDU length occupies two bytes, and indicates a length of the Encapsulated MSDU field. Encapsulated MSDU occupies a maximum of 64 bytes, and is filled with content of a data frame that triggers a CNM message.

The flow identifier is encapsulated in the RPID field included in the CN-TAG field of the CNM message.

It should be understood that content described in steps 201 to 205 is for a scenario in which types of hosts in FIG. 1 are a same type. When the hosts in FIG. 1 are of a plurality of types, before the obtaining a 5-tuple of a packet that causes the congestion, the method 200 should further include the following steps:

Step A: When detecting that the network congestion occurs, the aggregation layer device determines a type of a source node from which the packet that causes the congestion comes.

Step B1: When the source node of the packet belongs to the first type, perform step 204.

Step B2: When the source node of the packet belongs to the second type, perform corresponding steps in Embodiment 4 or 5.

Optionally, a source node of the first type is a data center quantified congestion notification (Data Center Quantified Congestion Notification, DCQCN) DCQCN server.

For detailed description of a DCQCN, refer to description of the standard IEEE 802.1Qau. A type of a packet sent by a QCN server is a data packet that carries a CN-TAG, as shown in FIG. 3A. A difference between the data packet and a common packet lies in that a CN-TAG field is added to the Ethernet header, and the CN-TAG field carries an RPID, that is, a Flow-ID, and is used to uniquely identify each packet (data flow) sent by the server.

Optionally, a source node of the second type is an RDMA over Converged Ethernet version 2.0 (RDMA over Converged Ethernet version 2.0, RoCEv2) server, where RDMA is remote direct memory access (Remote Direct Memory Access, RDMA). A format of a packet sent by a RoCEv2 server is different from that of a CNP server. For details, refer to FIG. 8A and description in Embodiment 4 or 5. Details are not described herein.

Optionally, there are a plurality of implementations for determining the type of the source node from which the packet that causes the congestion comes. For example, in a first implementation, a new field is extended in the packet, a name of the field is a source node type, and the field occupies one bit, where a value 1 indicates the first type, and a value 0 indicates the second type.

In a second implementation, a type of the source node host #1 is determined based on a priority field of the packet. For example, when the priority is level 1, it indicates that a host type is the first type, or when the priority is level 2, it indicates that a host type is the second type.

In a third implementation, a type of the source node host #1 is determined based on another field of the packet, for example, determined based on a source IP address field. For example, an IP address in one network segment is used for a host of the first type, and an IP address in another network segment is used for a host of the second type.

It should be understood that there are a plurality of implementations for determining the type of the source node. No limitation is imposed in this embodiment of the present invention.

It should be further understood that, based on the received second congestion control message, the host 1 limits or reduces a sending rate of a packet that has the flow identifier, and periodically attempts to increase the packet sending rate. If the congestion is cleared at this moment, increasing the packet sending rate will not cause congestion, and a CNM will not be received either. The packet sending rate can be finally restored to a value before the congestion.

In conclusion, in the technical solution provided in this embodiment of the present invention, when congestion is detected in a network, the 5-tuple of the packet that causes the network congestion is obtained, the flow identifier of the packet that causes the network congestion is obtained based on the information about the 5-tuple, and then a congestion control message is generated and is sent to the source node of the packet, to instruct the source node to reduce a rate of a packet that has the flow identifier. The technical solution may be applied to a layer 3 network.

Embodiment 2

Figure 5:
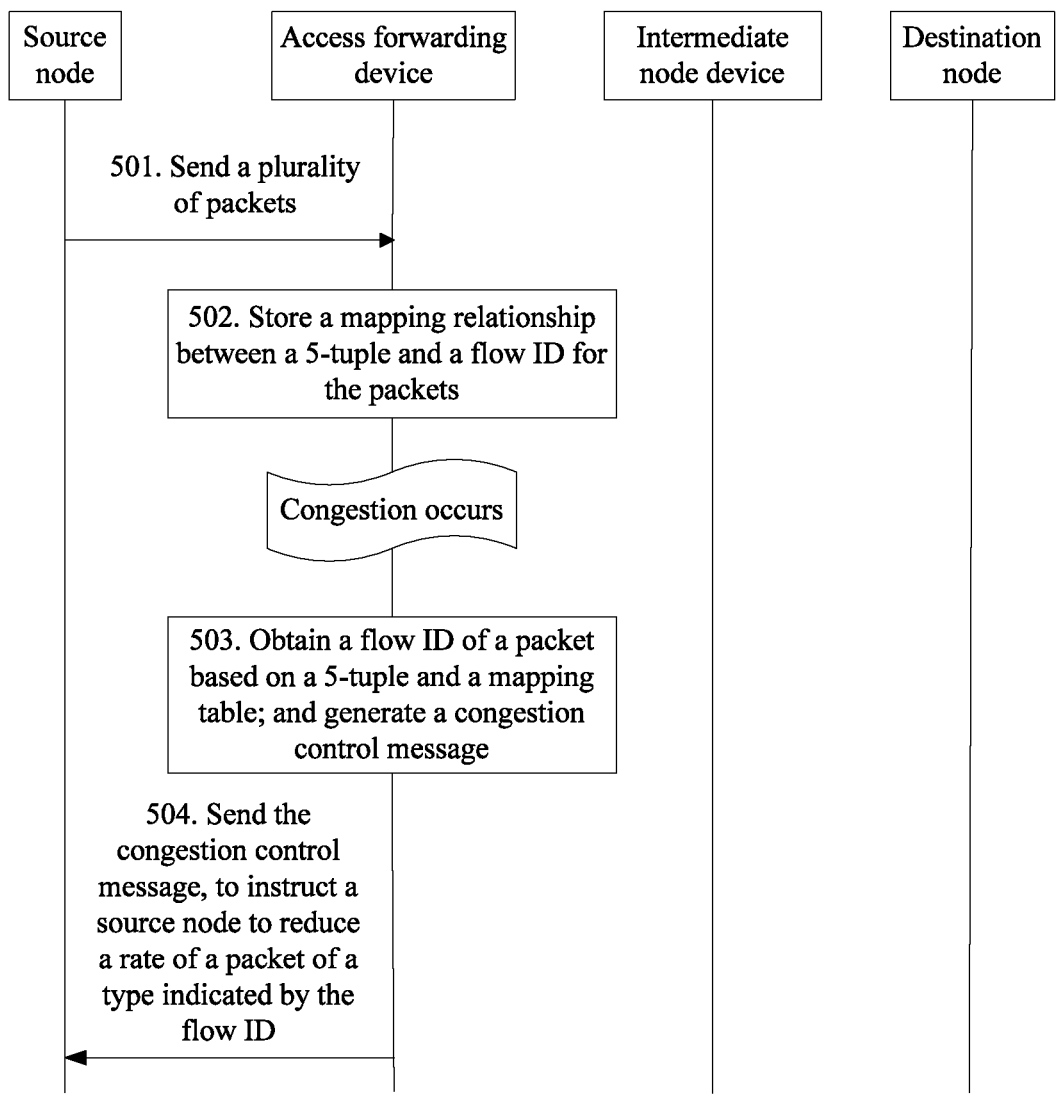
FIG. 5 is a schematic interaction diagram of a network congestion control method according to another embodiment of the present invention.

In a network architecture shown in FIG. 1, for example, a source node host 1 needs to send a packet to a destination node host 2, and the packet sequentially passes through an access forwarding device T1, an aggregation layer device A1, and an access layer device T2, and finally arrives at the host 2. If network congestion occurs in the intermediate node T1, as shown in FIG. 5, FIG. 5 is an interaction diagram of a network congestion control method according to another embodiment of the present invention. The method specifically includes the following steps:

Step 501: The host 1 sends a plurality of packets to the access forwarding device.

Step 502: The access forwarding device receives the plurality of packets, obtains 5-tuples of the plurality of packets and information about a flow identifier, establishes a table of a mapping relationship between a 5-tuple and a flow identifier, and locally stores the mapping relationship table. For the mapping relationship table, refer to Table 1 or Table 2 in Embodiment 1. Details are not described herein again.

Step 503: When congestion is detected in a network, obtain a 5-tuple of a packet that causes the network congestion; obtain, based on the table of a mapping relationship between a 5-tuple and a flow identifier, a flow identifier of the packet that causes the network congestion; and generate a network congestion control message, where the message carries the flow identifier.

Step 504: Send the network congestion control message to the host 1, to instruct the host 1 to reduce a sending rate of a packet that has the flow identifier.

It should be noted that descriptions of technical details such as a packet format and a format of the table of a mapping relationship between a 5-tuple and a flow identifier in Embodiment 1 may also be applied to Embodiment 2. Details are not described herein again.

Optionally, for a format of the network congestion control message, refer to an existing CNM format. As shown in FIG. 4B, a format of the network congestion control message includes a destination IP address, a source IP address, an S-TAT, a C-TAG, a CN-TAG, and a payload. For the format of the network congestion control message, further refer to description of the second congestion control message in Embodiment 1. Details are not described herein again.

It should be understood that the obtained flow identifier is encapsulated in an RPID field of a CN-TAG field of the CNM message.

It should be further understood that steps 501 to 504 are for a scenario in which types of hosts in FIG. 1 are a same type. When the hosts in FIG. 1 are of a plurality of types, before the obtaining a 5-tuple of a packet that causes the network congestion, the method 500 should further include the following steps:

Step A: When network congestion is detected, determine a type of a source node from which the packet that causes the congestion comes.

Step B: When the packet comes from a source node of the first type, proceed to step 503.

Optionally, a source node of the first type is a DCQCN server.

Optionally, a source node of the second type is a RoCEv2 server.

Optionally, there are a plurality of implementations for determining the type of the source node from which the packet that causes the congestion comes. For example, in a first implementation, a new field is extended in the packet, a name of the field is a source node type, and the field occupies one bit, where a value 1 indicates the first type, and a value 0 indicates the second type.

In a second implementation, a type of the source node host #1 is determined based on a priority field of the packet. For example, when the priority is level 1, it indicates that a host type is the first type, or when the priority is level 2, it indicates that a host type is the second type.

In a third implementation, a type of the source node host #1 is determined based on another field of the packet, for example, determined based on a source IP address field. For example, an IP address in one network segment is used for a host of the first type, and an IP address in another network segment is used for a host of the second type.

It should be understood that there are a plurality of implementations for determining the type of the source node. No limitation is imposed in this embodiment of the present invention.

In conclusion, in the technical solution provided in this embodiment of the present invention, when congestion is detected in a network, the 5-tuple of the packet that causes the network congestion is obtained, the flow identifier of the packet that causes the network congestion is obtained based on information about the 5-tuple, and then a congestion control message is generated and is sent to the source node of the packet, to instruct the source node to reduce a rate of a packet that has the flow identifier. The technical solution may be applied to a layer 3 network.

Embodiment 3

Figure 6:
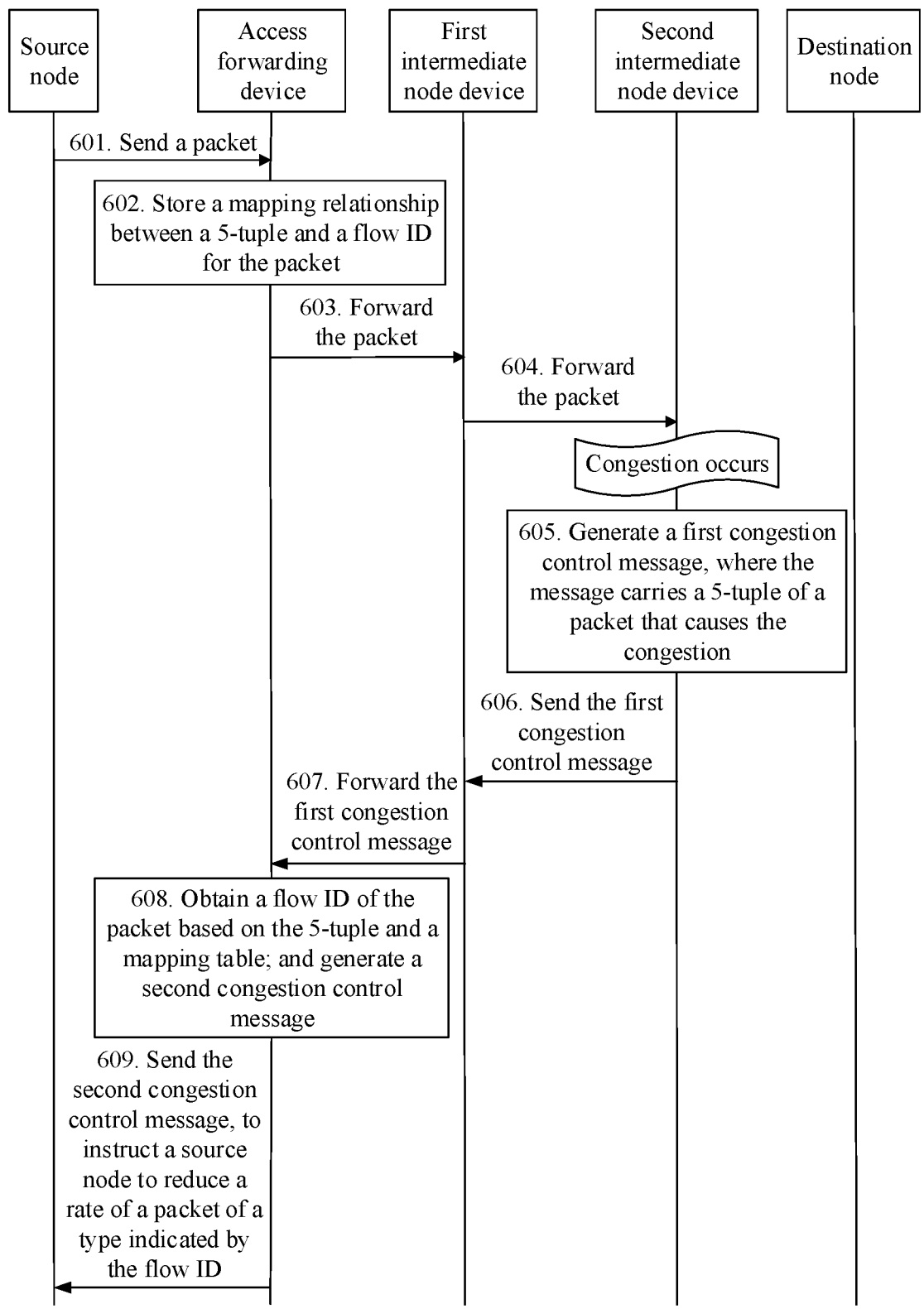
FIG. 6 is a schematic interaction diagram of a network congestion control method according to another embodiment of the present invention.

In a network architecture shown in FIG. 1, for example, a source node host 1 needs to send a packet to a destination node host 2, and the packet sequentially passes through an access forwarding device T1, an aggregation layer device A1, and an access layer device T2, and finally arrives at the host 2. If network congestion occurs in the intermediate node T2, as shown in FIG. 6, FIG. 6 shows an interaction diagram of a network congestion control method according to another embodiment of the present invention. The method specifically includes the following steps:

Step 601: The host 1 sends a plurality of packets to the access forwarding device.

Step 602: After receiving the plurality of packets, the access forwarding device obtains 5-tuples of the plurality of packets and information about a flow identifier, establishes a table of a mapping relationship between a 5-tuple and a flow identifier, and stores the mapping relationship table. For the mapping relationship table, refer to Table 1 or Table 2 in Embodiment 1. Details are not described herein again.

Step 603: Forward the plurality of packets to a first intermediate node device (for example, the aggregation layer device).

Step 604: The first intermediate node device receives the plurality of packets, and forwards the plurality of packets to a second intermediate node device (for example, a core network device or a backbone network device).

Step 605: When detecting that congestion is detected in a network, the second intermediate node device obtains information about a 5-tuple of a packet that causes the congestion; and generates a first congestion control message, where the message carries the 5-tuple of the packet that causes the congestion.

Step 606: Send the first congestion control message back to the first intermediate node device.

Step 607: After receiving the first congestion control message, the first intermediate node device forwards the first congestion control message to the access forwarding device.

Step 608: After receiving the first congestion control message, the access forwarding device obtains, based on the table of a mapping relationship between a 5-tuple and a flow identifier, a flow identifier of the packet that causes the congestion; and generates a second congestion control message, where the second congestion control message carries the flow identifier.

Step 609: Send the second congestion control message to the host 1, to instruct the host 1 to reduce a rate of a packet that has the flow identifier.

It should be noted that descriptions of technical details such as a packet format, a format of the table of a mapping relationship between a 5-tuple and a flow identifier, a format of the first congestion control message, and a format of the second congestion control message in Embodiment 1 may also be applied to Embodiment 3. Details are not described herein again.

It should be understood that steps 601 to 609 are for a scenario in which types of hosts in FIG. 1 are a same type. When the hosts in FIG. 1 are of a plurality of types, before the obtaining a 5-tuple of a packet that causes the network congestion, the method 600 should further include the following steps:

Step A: When network congestion is detected, determine a type of a source node from which the packet that causes the congestion comes.

Step B: When the packet comes from a source node of the first type, proceed to step 605.

Optionally, a source node of the first type is a CNP server.

Optionally, there are a plurality of implementations for determining the type of the source node from which the packet that causes the congestion comes. For example, in a first implementation, a new field is extended in the packet, a name of the field is a source node type, and the field occupies one bit, where a value 1 indicates the first type, and a value 0 indicates the second type.

In a second implementation, a type of the source node host #1 is determined based on a priority field of the packet. For example, when the priority is level 1, it indicates that a host type is the first type, or when the priority is level 2, it indicates that a host type is the second type.

In a third implementation, a type of the source node host #1 is determined based on another field of the packet, for example, determined based on a source IP address field. For example, an IP address in one network segment is used for a host of the first type, and an IP address in another network segment is used for a host of the second type.

It should be understood that there are a plurality of implementations for determining the type of the source node. No limitation is imposed in this embodiment of the present invention.

In conclusion, in the technical solution provided in this embodiment of the present invention, when congestion is detected in a network, the 5-tuple of the packet that causes the network congestion is obtained, the flow identifier of the packet that causes the network congestion is obtained based on the information about the 5-tuple, and then a congestion control message is generated and is sent to the source node of the packet, to instruct the source node to reduce a rate of a packet that has the flow identifier. The technical solution may be applied to a layer 3 network.

Embodiment 4

Figure 7:
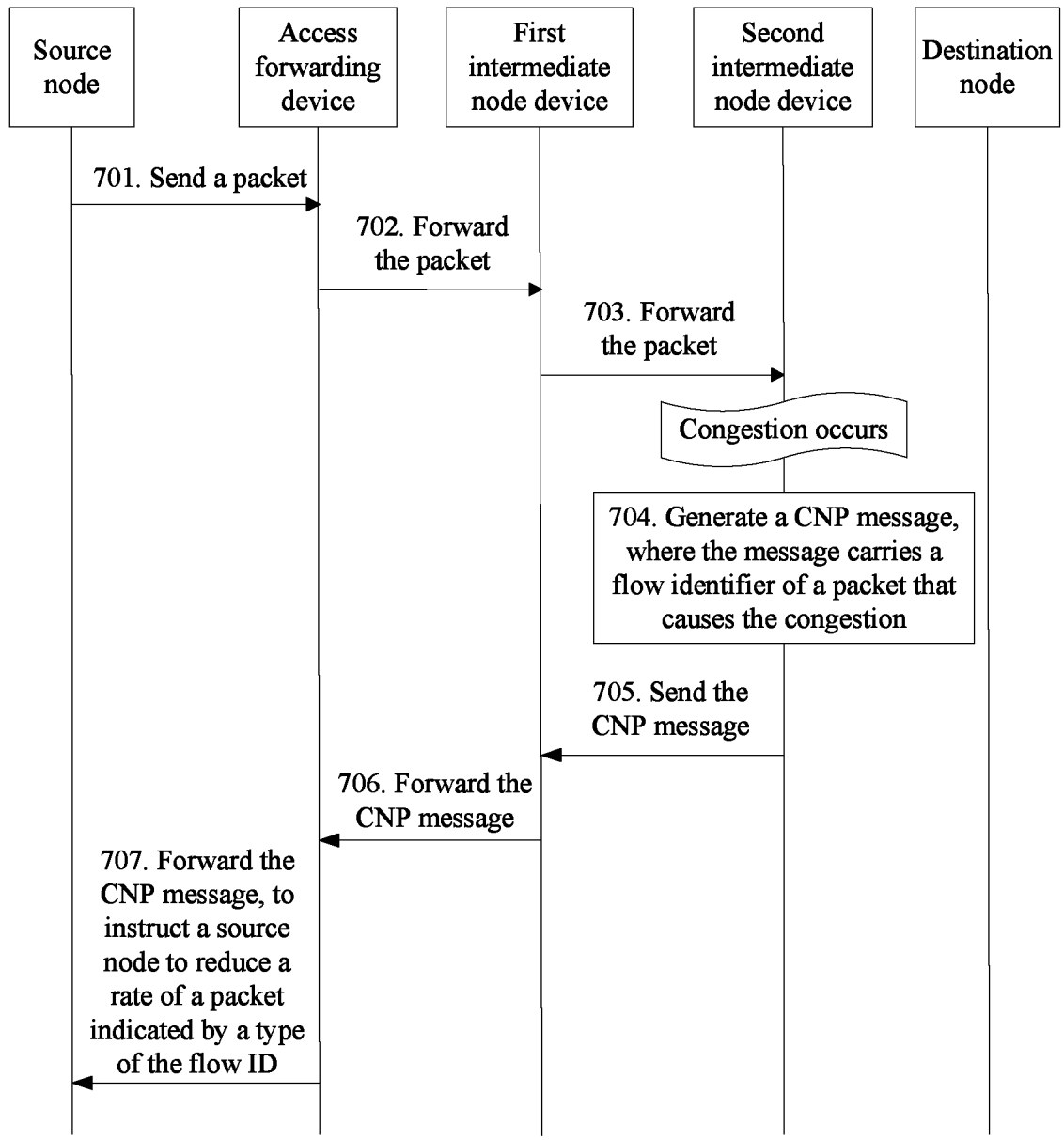
FIG. 7 is a schematic interaction diagram of a network congestion control method according to another embodiment of the present invention.

In a network architecture shown in FIG. 1, for example, a source node host 1 needs to send a packet to a destination node host 2, and the packet sequentially passes through an access forwarding device T1, an aggregation layer device A1, and an access layer device T2, and finally arrives at the host 2. If network congestion occurs in the intermediate node A1, as shown in FIG. 7, FIG. 7 shows an interaction diagram of network congestion control according to another embodiment of the present invention. In this embodiment, a host type is different from the host type in Embodiments 1 to 3, and belongs to the RoCEv2 server mentioned in Embodiment 1, and a format of a sent packet is also different from that in Embodiments 1 to 6. The method provided in this embodiment specifically includes the following steps.

Step 701: The host 1 sends one or more packets to the access forwarding device.

Figure 8A:
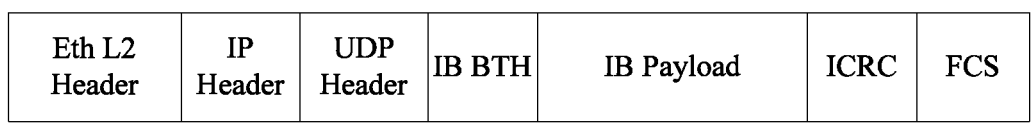
FIG. 8A is a schematic diagram of a frame format of a packet (data packet) according to an embodiment of the present invention.

FIG. 8A shows a packet structure. As shown in FIG. 8A, the packet structure includes an Ethernet layer 2 header Eth L2 Header, a network layer header IP Header, a user data packet header UDP Header, an IB base transport header (InfiniBand Base Transport Header, IB BTH), an IB payload (InfiniBand Payload, IB Payload), a cyclic redundancy code ICRC, and a frame check sequence (Frame Check Sequence, FCS). For meanings and detailed descriptions of fields of a RoCEv2 packet, refer to records in Supplement to Infini-Band Architecture Specification Volume 1 Release 1.2.1. Details are not described herein.

Figures 8B, 8C:
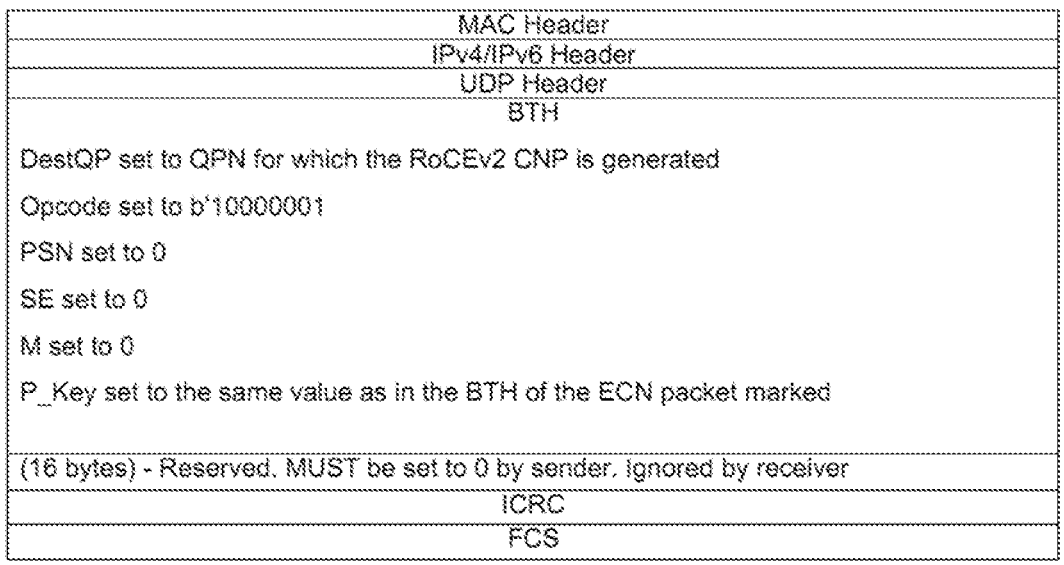
FIG. 8B is a schematic structural diagram of a CNP message format according to an embodiment of the present invention.
FIG. 8C is a schematic diagram of an internal structure of a BTH field according to an embodiment of the present invention.

The BTH field further includes a plurality of sub-fields, as shown in FIG. 8C.

Optionally, a flow identifier is encapsulated in the BTH field.

Optionally, a flow identifier is encapsulated in a DestQP field.

Step 702: The access forwarding device receives the one or more packets and forwards the one or more packets to a first intermediate node device.

Step 703: The first intermediate node device receives the one or more packets and forwards the one or more packets to a second intermediate node device.

Step 704: When congestion is detected in a network, the second intermediate node device generates a Congestion Notification Packet (CNP1) message, where the message carries a flow identifier of a packet that causes network congestion.

As shown in FIG. 8B, FIG. 8B shows a schematic diagram of a frame format of a CNP message. The CNP message includes a MAC header MAC header, an IP header IP header, a UDP header UDP header, a base transport header BTH, a reserved field reserved, a cyclic redundancy code ICRC check field, and a frame check sequence (Frame Check Sequence, FCS) field. For meanings and detailed descriptions of fields of the CNP message, refer to records in Supplement to InfiniBand Architecture Specification Volume 1 Release 1.2.1. Details are not described herein.

The BTH field further includes a plurality of sub-fields, as shown in FIG. 8C, for example, a destination queue pair DestQP field and an operation code opcode field. The flow identifier is encapsulated in the DestQP field of the BTH field.

Step 705: The second intermediate node device sends the CNP message to the first intermediate node device.

Step 706: The first intermediate node device receives the CNP message and forwards the CNP message to the access forwarding device.

Step 707: The access forwarding device receives the CNP message and forwards the CNP message to a source node, to instruct the source node to reduce a transmission rate of a packet that has the flow identifier.

It should be understood that a data flow to which the packet mentioned in this embodiment of the present invention belongs may be uniquely determined by a 7-tuple of a source IP, a destination IP, a protocol number, a source port number, a destination port number, an SrcQP, and a DestQP. In step 704, when congestion is detected in a network, the second intermediate node identifies the packet that causes the congestion, parses out a destination queue pair (Destination Queue Pair, DestQP) carried in the packet, and sets the DestQP as a source queue pair (Source Queue Pair, SrcQP) during construction of the CNP.

A source IP and a destination IP of the CNP are respectively a destination IP and a source IP of the packet that causes the congestion, a source port number and a destination port number of the UDP are respectively a source port number and a destination port number of the packet that causes the congestion, and an opcode is 0x81.

It should be understood that steps 701 to 707 are for a scenario in which types of hosts in FIG. 1 are a same type. When the hosts in FIG. 1 are of a plurality of types, before the generating a CNP message, the method 700 should further include the following steps:

Step A: When network congestion is detected, determine a type of a source node from which the packet that causes the congestion comes.

Step B: When the packet comes from a source node of a second type, proceed to step 704.

Optionally, a source node of the second type is a RoCEv2 server.

Optionally, there are a plurality of implementations for determining the type of the source node from which the packet that causes the congestion comes. For example, in a first implementation, a new field is extended in the packet, a name of the field is a source node type, and the field occupies one bit, where a value 1 indicates a first type, and a value 0 indicates the second type.

In a second implementation, a type of the source node host #1 is determined based on a priority field of the packet. For example, when the priority is level 1, it indicates that a host type is the first type, or when the priority is level 2, it indicates that a host type is the second type.

In a third implementation, a type of the source node host #1 is determined based on another field of the packet, for example, determined based on a source IP address field. For example, an IP address in one network segment is used for a host of the first type, and an IP address in another network segment is used for a host of the second type.

It should be understood that there are a plurality of implementations for determining the type of the source node. No limitation is imposed in this embodiment of the present invention. In conclusion, in the technical solution provided in this embodiment of the present invention, when congestion is detected in a network, because the CNP is directly generated when the congestion reaches a threshold, a control loop delay (Control Loop Delay, CLD) is greatly reduced. Therefore, a queue depth and a packet delay can be reduced, thereby improving service performance.

Embodiment 5

Figure 9:
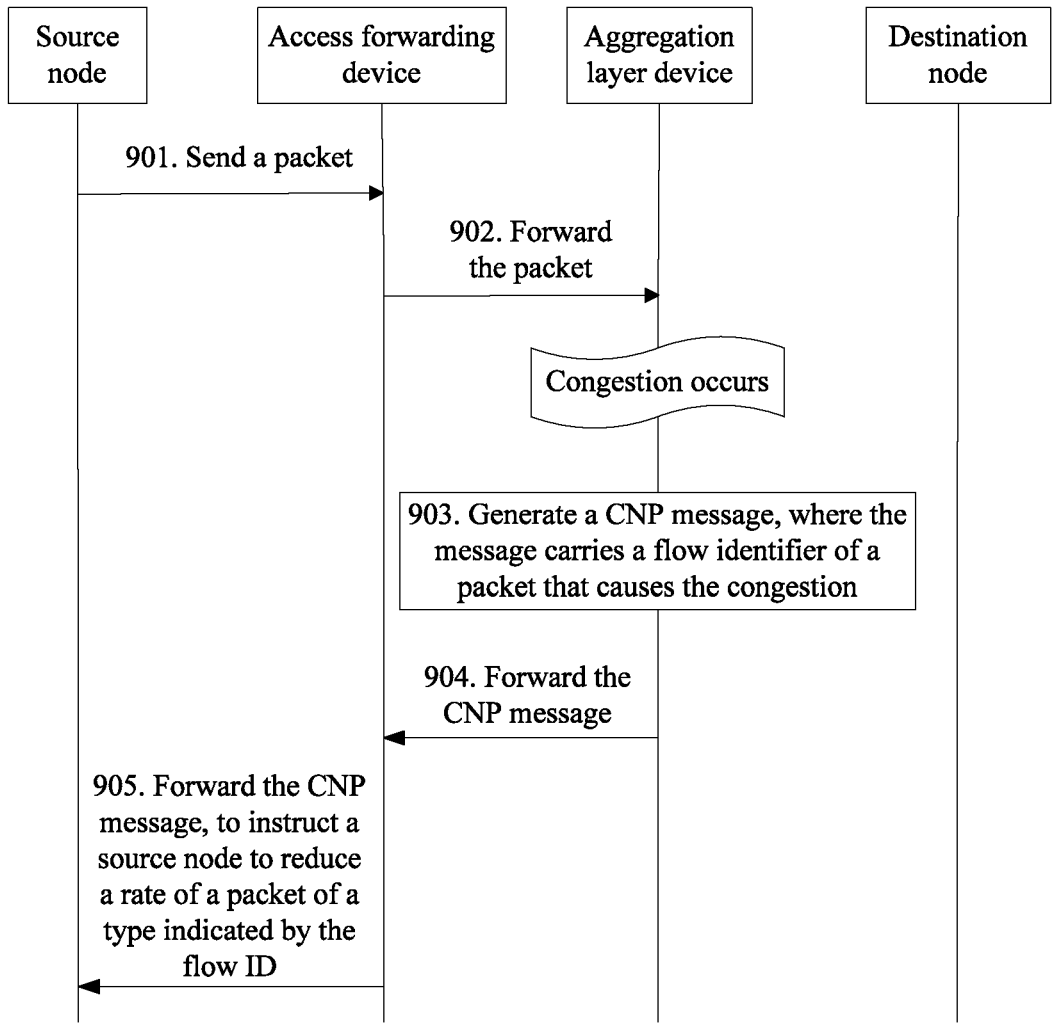
FIG. 9 is a schematic interaction diagram of a network congestion control method according to another embodiment of the present invention.

In a network architecture shown in FIG. 1, for example, a source node host 1 needs to send a packet to a destination node host 2, and the packet sequentially passes through an access forwarding device T1, an aggregation layer device A1, and an access layer device T2, and finally arrives at the host 2. If network congestion occurs in the intermediate node A1, as shown in FIG. 9, FIG. 9 shows an interaction diagram of network congestion control according to another embodiment of the present invention. In this embodiment, host types are the same as the types described in Embodiment 4. The method specifically includes the following steps.

Step 901: The host 1 sends a plurality of packets to the access forwarding device.

For a structure of the packet, refer to FIG. 8A and description in Embodiment 4. Details are not described herein again.

Optionally, the packet carries a flow identifier, and the flow identifier is encapsulated in a BTH field of the packet.

Optionally, the packet carries a flow identifier, and the flow identifier is encapsulated in a DestQP field of the packet.

Step 902: The access forwarding device receives the plurality of packets and forwards the plurality of packets to the aggregation layer device.

Step 903: When congestion is detected in a network, the aggregation layer device generates a CNP message, where the message carries a flow identifier of a packet that causes network congestion.

Optionally, the flow identifier is encapsulated in a BTH field of the CNP message.

Optionally, the flow identifier is encapsulated in a DestQP field of the CNP message.

Step 904: The aggregation layer device sends the CNP message to the access forwarding device.

Step 905: The access forwarding device receives the CNP message and forwards the CNP message to the source node host 1, to instruct the source node host 1 to reduce a transmission rate of a packet that has the flow identifier.

Optionally, for a format of the CNP message, refer to Embodiment 4 and FIG. 8B. Details are not described herein again.

It should be understood that a data flow to which the packet mentioned in this embodiment of the present invention belongs may be uniquely determined by a 7-tuple of a source IP, a destination IP, a protocol number, a source port number, a destination port number, an SrcQP, and a DestQP. In step 903, when congestion is detected in the network, the aggregation layer device identifies the packet that causes the congestion, parses out a DestQP carried in the packet, and sets the DestQP as an SrcQP during construction of the CNP.

A source IP and a destination IP of the CNP message are respectively a destination IP and a source IP of the packet that causes the congestion, a source port number and a destination port number of the UDP are respectively a source port number and a destination port number of the packet that causes the congestion, and an operation code (opcode) is 0x81.

It should be understood that steps 901 to 905 are for a scenario in which types of hosts in FIG. 1 are a same type. When the hosts in FIG. 1 are of a plurality of types, before the generating a CNP message, the method 900 should further include the following steps:

Step A: When network congestion is detected, determine a type of a source node from which the packet that causes the congestion comes.

Step B: When the packet comes from a source node of a second type, proceed to step 903.

Optionally, when the packet comes from a source node of a first type, refer to descriptions in Embodiments 1 to 3.

Optionally, a source node of the first type is a DCQCN server.

A source node of the second type is a RoCEv2 server.

Optionally, there are a plurality of implementations for determining the type of the source node from which the packet that causes the congestion comes. For example, in a first implementation, a new field is extended in the packet, a name of the field is a source node type, and the field occupies one bit, where a value 1 indicates the first type, and a value 0 indicates the second type.

In a second implementation, a type of the source node host #1 is determined based on a priority field of the packet. For example, when the priority is level 1, it indicates that a host type is the first type, or when the priority is level 2, it indicates that a host type is the second type.

In a third implementation, a type of the source node host #1 is determined based on another field of the packet, for example, determined based on a source IP address field. For example, an IP address in one network segment is used for a host of the first type, and an IP address in another network segment is used for a host of the second type.

It should be understood that there are a plurality of implementations for determining the type of the source node. No limitation is imposed in this embodiment of the present invention. In conclusion, in the technical solution provided in this embodiment of the present invention, when congestion is detected in a network, because the CNP is directly generated when the congestion reaches a threshold, a control loop delay CLD is greatly reduced. Therefore, a queue depth and a packet delay can be reduced, thereby improving service performance.

Embodiment 6

Figure 10:
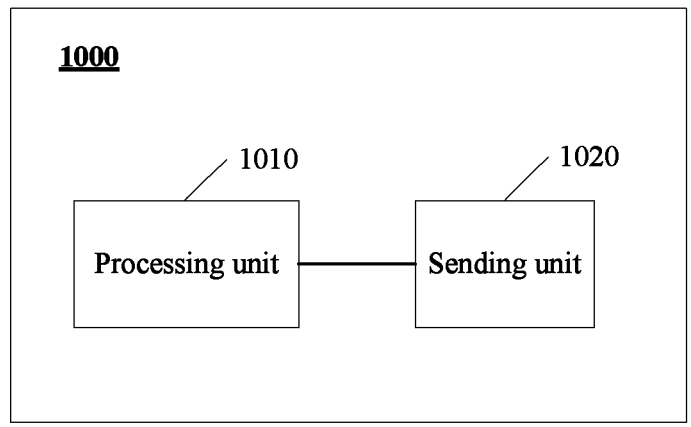
FIG. 10 is a schematic diagram of an internal structure of a network device according to an embodiment of the present invention.

FIG. 10 shows a schematic diagram of an internal structure of a network device according to an embodiment of the present invention. As shown in FIG. 10, the network device 1000 includes a processing unit 1010 and a sending unit 1020. The processing unit 1010 is configured to: when network congestion is detected, obtain a 5-tuple of a packet that causes the network congestion; and generate a congestion control message, where the congestion control message carries the 5-tuple of the packet. The sending unit 1020 is configured to send the congestion control message to an access forwarding device of a source node of the packet.

Specifically, for a format of the packet, refer to descriptions in Embodiment 1 and FIG. 3A. Details are not described herein again.

It should be understood that the 5-tuple is a source IP address, a destination IP, a source port number, a destination port number, and a protocol type carried in the packet.

Optionally, the processing unit 1010 is further configured to determine a type of the source node of the packet.

Optionally, the type of the source node of the packet is determined by priority information, a source node type field, or an IP address carried in the packet.

Optionally, there are a plurality of implementations for determining the type of the source node from which the packet that causes the congestion comes. For example, in a first implementation, a new field is extended in the packet, a name of the field is a source node type, and the field occupies one bit, where a value 1 indicates a first type, and a value 0 indicates a second type.

In a second implementation, a type of a source node host #1 is determined based on a priority field of the packet. For example, when the priority is level 1, it indicates that a host type is the first type, or when the priority is level 2, it indicates that a host type is the second type.

In a third implementation, a type of a source node host #1 is determined based on another field of the packet, for example, determined based on a source IP address field. For example, an IP address in one network segment is used for a host of the first type, and an IP address in another network segment is used for a host of the second type.

It should be understood that there are a plurality of implementations for determining the type of the source node. No limitation is imposed in this embodiment of the present invention. Optionally, for a format of the congestion control message, refer to descriptions in Embodiment 1, Table 3, and FIG. 4A. Details are not described herein again.

Optionally, the congestion control message further carries information used to indicate a congestion degree.

Optionally, the information used to indicate a congestion degree includes one or more pieces of the following information: a quantized feedback value of the congestion control message, a congestion point identifier, a current quantity of available bytes of a congestion point sending queue, or a difference between two quantities of available bytes of a congestion point CP sending queue.

Embodiment 7

Figure 11:
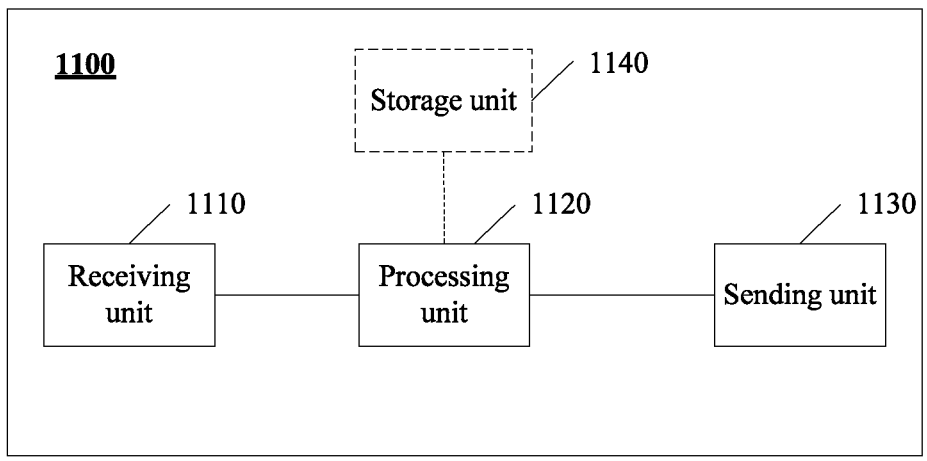
FIG. 11 is a schematic diagram of an internal structure of a network device according to another embodiment of the present invention.

FIG. 11 shows a schematic diagram of an internal structure of a network device according to another embodiment of the present invention. As shown in FIG. 11, the network device 1100 includes a receiving unit 1110, a processing unit 1120, and a sending unit 1130. The receiving unit 1110 is configured to receive a first congestion control message, where the first congestion control message carries a 5-tuple of a packet that causes congestion. The processing unit 1120 is configured to: obtain a flow identifier of the packet based on the 5-tuple of the packet; and generate a second congestion control message, where the second congestion control message carries the flow identifier. The sending unit 1130 is configured to send the second congestion control message to a source node of the packet.

It should be understood that for a format of the packet, refer to descriptions in Embodiment 1 and FIG. 3A. Details are not described herein again.

Optionally, the receiving unit 1110 is further configured to receive one or more packets from the source node of the packet.

Optionally, the network device 1100 further includes a storage unit 1140, configured to store a table of a mapping relationship between a 5-tuple and a flow identifier for the one or more packets. It should be understood that the table of a mapping relationship between a 5-tuple and a flow identifier may be shown in Table 2 or Table 3. Details are not described herein again.

It should be understood that the flow identifier is encapsulated in an RPID field of a CN-TAG field of the packet, and the 5-tuple is encapsulated in an MSDU field of the packet.

Optionally, for a format of the first congestion control message and a format of the second congestion control message, refer to description in Embodiment 1.

Optionally, the second congestion control message is a congestion notification message, the congestion notification message carries a CN-TAG field, and the flow identifier is carried in an RPID field of the CN-TAG field.

Optionally, the first congestion control message further carries information used to indicate a congestion degree.

Optionally, the information used to indicate a congestion degree includes one or more pieces of the following information: a quantized feedback value of the congestion control message, a congestion point identifier, a current quantity of available bytes of a congestion point sending queue, or a difference between two quantities of available bytes of a congestion point sending queue.

Optionally, the processing unit 1120 is further configured to determine a type of the source node of the packet.

It should be understood that this embodiment of the present invention is an apparatus embodiment corresponding to Method Embodiment 2, and description of the method embodiment is also applied to this embodiment of the present invention. Details are not described herein again.

In conclusion, in the technical solution provided in this embodiment of the present invention, when congestion is detected in a network, the 5-tuple of the packet that causes the network congestion is obtained, the flow identifier of the packet that causes the network congestion is obtained based on information about the 5-tuple, and then a congestion control message is generated and is sent to the source node of the packet, to instruct the source node to reduce a rate of a packet that has the flow identifier. The technical solution may be applied to a layer 3 network.

Embodiment 8

Figure 12:
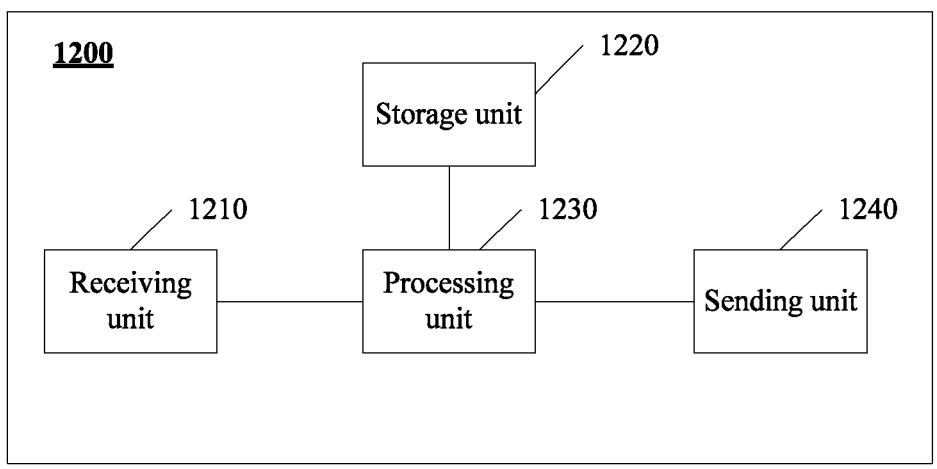
FIG. 12 is a schematic diagram of an internal structure of a network device according to another embodiment of the present invention.

FIG. 12 shows a schematic diagram of an internal structure of a network device according to another embodiment of the present invention. As shown in FIG. 12, the network device 1200 includes a receiving unit 1210, a storage unit 1220, a processing unit 1230, and a sending unit 1240. The receiving unit 1210 is configured to receive a plurality of packets from a source node. The storage unit 1220 is configured to store a mapping relationship between a 5-tuple and a flow identifier for the plurality of packets. The processing unit 1230 is configured to: when network congestion is detected, obtain a 5-tuple of a packet that causes the congestion; obtain, based on the 5-tuple, a flow identifier corresponding to the packet; and generate a congestion control message, where the congestion control message carries the flow identifier. The sending unit 1240 is configured to send the congestion control message to the source node device of the packet that causes the congestion, so that the source node device reduces a packet transmission rate based on the congestion control message.

Optionally, the processing unit 1230 is further configured to determine a type of the source node of the packet.

Optionally, there are a plurality of implementations for determining the type of the source node from which the packet that causes the congestion comes. For example, in a first implementation, a new field is extended in the packet, a name of the field is a source node type, and the field occupies one bit, where a value 1 indicates a first type, and a value 0 indicates a second type.

In a second implementation, a type of a source node host #1 is determined based on a priority field of the packet. For example, when the priority is level 1, it indicates that a host type is the first type, or when the priority is level 2, it indicates that a host type is the second type.

In a third implementation, a type of a source node host #1 is determined based on another field of the packet, for example, determined based on a source IP address field. For example, an IP address in one network segment is used for a host of the first type, and an IP address in another network segment is used for a host of the second type.

It should be understood that there are a plurality of implementations for determining the type of the source node. No limitation is imposed in this embodiment of the present invention. Optionally, for a format of the congestion control message, refer to description in Embodiment 1 or FIG. 4A. Details are not described herein again.

Optionally, the congestion control message further carries information used to indicate a congestion degree.

Optionally, the information used to indicate a congestion degree includes one or more pieces of the following information: a quantized feedback value of the congestion control message, a congestion point identifier, a current quantity of available bytes of a congestion point sending queue, or a difference between two quantities of available bytes of a congestion point sending queue.

It should be understood that this embodiment of the present invention is an apparatus embodiment corresponding to Method Embodiment 3, and description of the method embodiment is also applied to this embodiment of the present invention. Details are not described herein again.

In conclusion, in the technical solution provided in this embodiment of the present invention, when congestion is detected in a network, the 5-tuple of the packet that causes the network congestion is obtained, the flow identifier of the packet that causes the network congestion is obtained based on information about the 5-tuple, and then a congestion control message is generated and is sent to the source node of the packet, to instruct the source node to reduce a rate of a packet that has the flow identifier. The technical solution may be applied to a layer 3 network.

It should be understood that the network devices in FIGS. 10 to 12 are shown in a form of functional units. When not limited, the term "unit" used in the specification may be an application-specific integrated circuit (ASIC), an electronic circuit, a (shared, dedicated, or group) processor, or a memory that executes one or more software or firmware programs, a combinatorial logic circuit, and/or another suitable component that provides the function.

Embodiment 9

Figure 13:
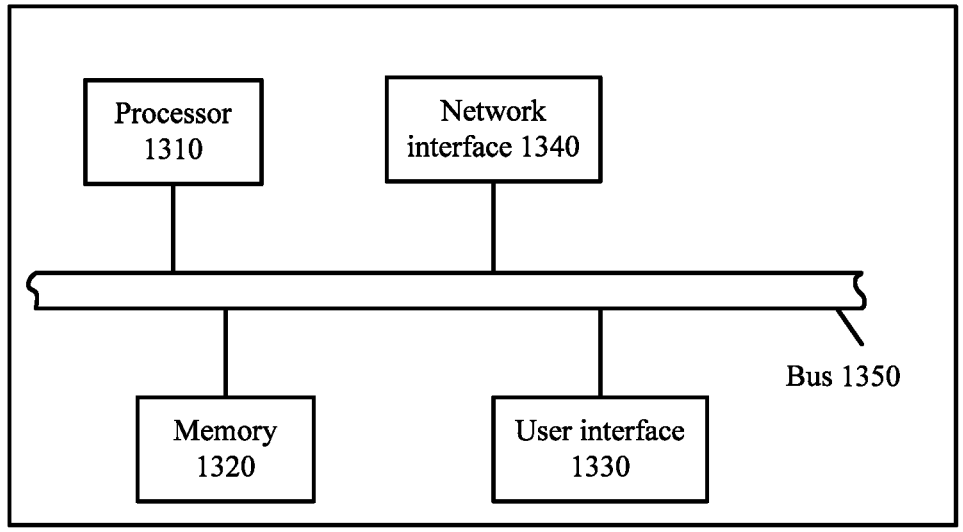
FIG. 13 is a schematic block diagram of a network device according to another embodiment of the present invention.

FIG. 13 is a schematic block diagram of a network device according to another embodiment of the present invention. The network device 1300 includes a processor 1310, a memory 1320, a bus 1350, a user interface 1330, and a network interface 1340.

Specifically, the processor 1310 controls operations of the network device 1300. The processor may be a general purpose processor, a digital signal processor, an application-specific integrated circuit, or a field programmable gate array or another programmable logic device.

The user interface 1330 is configured to connect to a lower layer network device.

The network interface 1340 is configured to connect to an upper layer network device.

Components of the network device 1300 are coupled together through the bus 1350. In addition to a data bus, the bus 1350 further includes a power bus, a control bus, and a status signal bus. However, for clear description, the buses are all denoted as the bus 1350 in the figure. It should be noted that the foregoing descriptions of a network element structure can be applied to this embodiment of the present invention.

The memory 1320 may include a read-only memory (Read Only Memory, ROM), a random access memory (Random Access Memory, RAM), another type of dynamic storage device that can store information and an instruction, or a magnetic disk storage. The memory 1320 may be configured to store an instruction used to implement related methods provided in the embodiments of the present invention. It can be understood that by programming or loading an executable instruction to the processor 1310 of the network device 1300, at least one executable instruction can be buffered or stored. In a specific embodiment, the memory is configured to store computer executable program code. When the program code includes an instruction and the processor executes the instruction, the instruction makes the network element perform the following operations:

when network congestion is detected, obtaining a 5-tuple of a packet that causes the network congestion;

generating a congestion control message, where the congestion control message carries the 5-tuple of the packet; and sending the congestion control message to an access forwarding device of a source node of the packet.

Alternatively, when the program code includes an instruction and the processor executes the instruction, the instruction makes the network element perform the following operations:

receiving a first congestion control message, where the first congestion control message carries a 5-tuple of a packet that causes congestion;

obtaining a flow identifier of the packet based on the 5-tuple of the packet that causes the congestion;

generating a second congestion control message, where the second congestion control message carries the flow identifier of the packet; and sending the second congestion control message to a source node of the packet.

Alternatively, when the program code includes an instruction and the processor executes the instruction, the instruction makes the network element perform the following operations:

receiving one or more packets from a source node;

establishing a mapping relationship between a 5-tuple and a flow identifier for the one or more packets;

when network congestion is detected, obtaining a 5-tuple of a packet that causes the congestion;

obtaining, based on the mapping relationship, a flow identifier of the packet that causes the congestion;

generating a congestion control message, where the congestion control message carries the flow identifier; and sending the congestion control message to the source node, to instruct the source node to reduce a transmission rate of a packet that has the flow identifier.

For a specific implementation of an operation performed by the processor included in the foregoing network element serving as the network device, refer to corresponding steps performed by the network devices in Embodiments 1 to 3. Details are not described in this embodiment of the present invention again.

Embodiment 10

Figure 14:
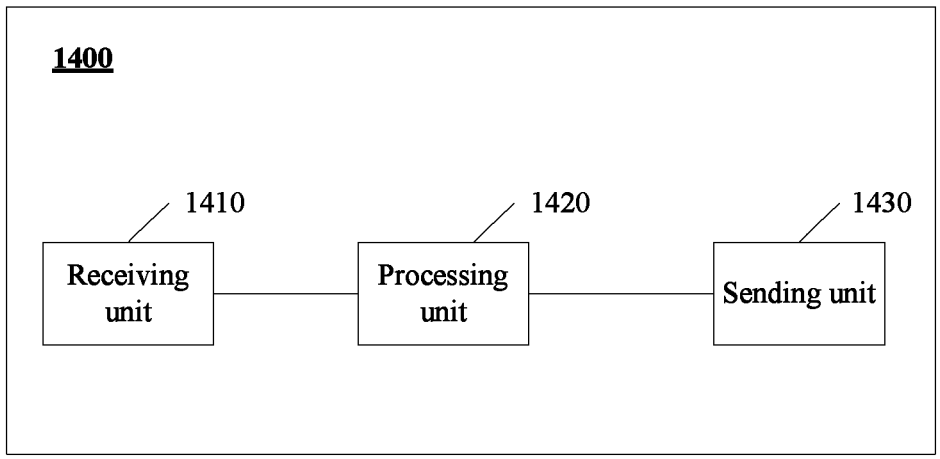
FIG. 14 is a schematic diagram of an internal structure of a network device according to another embodiment of the present invention.

FIG. 14 shows a schematic diagram of an internal structure of a network device according to another embodiment of the present invention. As shown in FIG. 14, the network device 1400 includes a receiving unit 1410, a processing unit 1420, and a sending unit 1430. The receiving unit 1410 is configured to receive a plurality of packets from a source node. The processing unit 1420 is configured to generate a CNP message when congestion is detected in a network, where the CNP message carries a flow identifier of a packet that causes congestion. The sending unit 1430 is configured to send the CNP message to the source node, to instruct the source node to reduce a transmission rate of a packet that has the flow identifier.

Optionally, the packet is a standard RoCE packet or a standard RoCEv2 packet.

For the RoCE or RoCEv2 packet, specifically refer to FIG. 8A or records in Supplement to InfiniBand Architecture Specification Volume 1 Release 1.2.1. Details are not described herein.

Optionally, the packet carries a flow identifier, and the flow identifier is encapsulated in a BTH field of the packet.

Optionally, the packet carries a flow identifier, and the flow identifier is encapsulated in a DestQP field of the packet.

Optionally, the CNP message carries a flow identifier, and the flow identifier is encapsulated in a BTH field of the CNP message.

Optionally, the CNP message carries a flow identifier, and the flow identifier is encapsulated in a DestQP field of the CNP message.

Optionally, the processing unit 1420 is further configured to determine a type of the source node.

Optionally, the type of the source node is determined by a priority field of the packet.

Specifically, there are a plurality of implementations for determining priority information of the source node of the packet. In a first implementation, a new field is extended in the packet, a name of the field is a source node type, and the field occupies one bit, where a value 1 indicates a first type, and a value 0 indicates a second type.

In a second implementation, a type of the source node is determined based on the priority field of the packet. For example, when the priority is level 1, it indicates that a host type is the first type, or when the priority is level 2, it indicates that a host type is the second type.

In a third implementation, a type of the source node is determined based on another field of the packet, for example, determined based on a port number field or a protocol type field. For example, when a protocol type is 6, it indicates that a host is in the first type, and when a protocol type is 7, it indicates that the host is in the second type.

Optionally, the type of the source node is a RoCEv2 server.

Optionally, a destination address of the CNP message is an IP address of the RoCEV2 server.

For a specific implementation of an operation performed by the processing unit included in the foregoing network element serving as the network device, refer to corresponding steps performed by the network devices in Embodiments 4 and 5. Details are not described in this embodiment of the present invention again.

In conclusion, in the technical solution provided in this embodiment of the present invention, for a packet sent by the RoCEv2 server, because the CNP is directly generated when network congestion occurs, a control loop delay is greatly reduced. Therefore, a queue depth and a packet delay can be reduced, thereby improving service performance.

Embodiment 11

Figure 15:
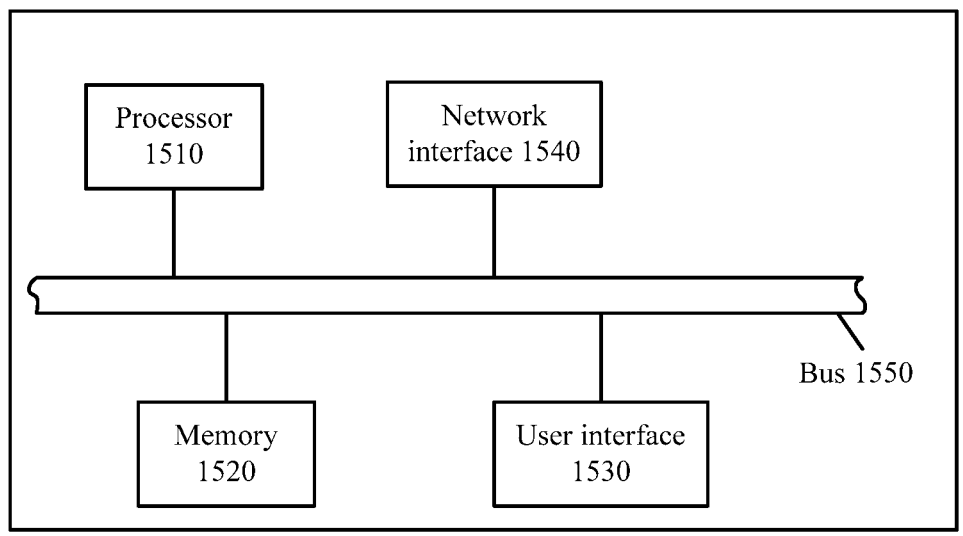
FIG. 15 is a schematic block diagram of a network device according to another embodiment of the present invention.

FIG. 15 is a schematic block diagram of a network device according to another embodiment of the present invention. The network device 1500 includes a processor 1510, a memory 1520, a bus 1550, a user interface 1530, and a network interface 1540.

Specifically, the processor 1510 controls operations of the network device 1500. The processor may be a general purpose processor, a digital signal processor, an application-specific integrated circuit, or a field programmable gate array or another programmable logic device.

The user interface 1530 is configured to connect to a lower layer network device.

The network interface 1540 is configured to connect to an upper layer network device.

Components of the network device 1500 are coupled together through the bus 1550. In addition to a data bus, the bus 1550 further includes a power bus, a control bus, and a status signal bus. However, for clear description, the buses are all denoted as the bus 1550 in the figure. It should be noted that the foregoing descriptions of a network element structure can be applied to this embodiment of the present invention.

The memory 1520 may include a read-only memory (Read Only Memory, ROM), a random access memory (Random Access Memory, RAM), another type of dynamic storage device that can store information and an instruction, or a magnetic disk storage. The memory 1520 may be configured to store an instruction used to implement related methods provided in the embodiments of the present invention. It can be understood that by programming or loading an executable instruction to the processor 1510 of the network device 1500, at least one executable instruction can be buffered or stored. In a specific embodiment, the memory is configured to store computer executable program code. When the program code includes an instruction and the processor executes the instruction, the instruction makes the network element perform the following operations:

receiving a plurality of packets from a source node;

when network congestion is detected, generating a CNP message; and sending the CNP message to the source node, to instruct the source node to reduce a data rate.

For a specific implementation of an operation performed by the processor included in the foregoing network element serving as the network device, refer to corresponding steps performed by the network devices in Embodiments 4 and 5. Details are not described in this embodiment of the present invention again.

An embodiment of the present invention further provides a computer storage medium, configured to store a computer software instruction used by user equipment, and the computer software instruction includes a program used to execute the design in the foregoing aspects.

An embodiment of the present invention further provides a computer storage medium, configured to store a computer software instruction used by the foregoing network device, and the computer software instruction includes a program used to execute the design in the foregoing aspects.

An embodiment of the present invention further provides a communications network system, including a source node, a first intermediate node, a second intermediate node, and a destination node device.

The source node is configured to send one or more packets to the first intermediate node device.

The first intermediate node is configured to store a table of a mapping relationship between a 5-tuple and a flow identifier for the one or more packets, and forward the one or more packets to the second intermediate node.

The second intermediate node is configured to: when network congestion is detected, obtain a 5-tuple of a packet that causes the congestion; generate a first congestion control message, where the first congestion control message carries the 5-tuple of the packet that causes the congestion; and send the first congestion control message to the first intermediate node.

The first intermediate node is configured to: obtain, based on the 5-tuple carried by the first congestion control message, a flow identifier of the packet that causes the congestion; generate a second congestion control message, where the second congestion control message carries the flow identifier; and send the second congestion control message to the source node.

The source node is configured to limit, based on the second congestion control message, a rate of a packet that has the flow identifier.

For specific implementations of operations performed by network elements included in the foregoing network system, refer to corresponding steps performed by corresponding network devices in Embodiments 1 to 5. Details are not described in this embodiment of the present invention again.

In the technical solution provided in this embodiment of the present invention, when congestion is detected in a network, the 5-tuple of the packet that causes the network congestion is obtained, the flow identifier of the packet that causes the network congestion is obtained based on information about the 5-tuple, and then a congestion control message is generated and is sent to the source node of the packet, to instruct the source node to reduce a rate of a packet that has the flow identifier. The technical solution may be applied to a layer 3 network.

A person of ordinary skill in the art may understand that all or some of the steps of the foregoing embodiments may be implemented by hardware or a program instructing related hardware. The program may be stored in a computer readable storage medium. The storage medium may include a read-only memory, a magnetic disk, or an optical disc.

A person of ordinary skill in the art may understand that all or some of the steps of the foregoing methods may be implemented by a program instructing related hardware. The program may be stored in a computer readable storage medium. The computer readable storage medium includes, for example, a ROM, a RAM, and an optical disc.

In conclusion, the foregoing descriptions are merely examples of embodiments of the present invention, and are not intended to limit the protection scope of the present invention. Any modification, equivalent replacement, or improvement made without departing from the spirit and principle of the present invention shall fall within the protection scope of the present invention.

What is claimed is:

1. A network congestion control method, comprising:
    establishing mapping relationships between 5-tuples of packets and corresponding flow identifiers of the packets;
    in response to detecting a network congestion, obtaining a 5-tuple of a packet that causes the network congestion;
    obtaining, based on the established mapping relationships and using the 5-tuple of the packet that causes the network congestion, a flow identifier of the packet that causes the network congestion;
    generating a congestion control message, wherein the congestion control message carries the 5-tuple of the packet that causes the network congestion and the flow identifier of the packet that causes the network congestion, wherein the 5-tuple of the packet is encapsulated in a payload field of the congestion control message; and
    sending the congestion control message to a source node of the packet.

2. The method according to claim 1, wherein the method further comprises:
    determining a type of the source node of the packet.

3. The method according to claim 2, wherein the type of the source node of the packet is determined by using one of the following fields of the packet: a device type field, a priority field, or a source Internet Protocol (IP) address field.

4. The method according to claim 1, wherein a destination address of the congestion control message is an Internet Protocol (IP) address of the source node of the packet.

5. The method according to claim 1, wherein the congestion control message further carries information that indicates a congestion degree.

6. The method according to claim 5, wherein the information that indicates the congestion degree comprises one or more pieces of the following information: a congestion point identifier, a current quantity of available bytes of a congestion point sending queue, or a difference between two quantities of available bytes of a congestion point sending queue.

7. The method according to claim 5, wherein the information that indicates the congestion degree comprises a quantized feedback value of the congestion control message.

8. A network device, comprising:
    a non-transitory memory storage comprising instructions;
    a hardware processor in communication with the non-transitory memory storage, wherein the hardware processor executes the instructions to:
        establish mapping relationships between 5-tuples of packets and corresponding flow identifiers of the packets;
        in response to detecting a network congestion, obtain a 5-tuple of a packet that causes the network congestion; and
        obtain, based on the established mapping relationships and using the 5-tuple of the packet that causes the network congestion, a flow identifier of the packet that causes the network congestion;
        generate a congestion control message, wherein the congestion control message carries the 5-tuple of the packet that causes the network congestion and the flow identifier of the packet that causes the network congestion, wherein the 5-tuple of the packet is encapsulated in a payload field of the congestion control message; and a transmitter, configured to send the congestion control message to a source node of the packet.

9. The network device according to claim 8, wherein the hardware processor executes the instructions to:

determine a type of the source node of the packet.

10. The network device according to claim 9, wherein the type of the source node of the packet is determined by using one of the following fields of the packet: a device type field, a priority field, or a source Internet Protocol (IP) address field.

11. The network device according to claim 8, wherein a destination address of the congestion control message is an Internet Protocol (IP) address of the source node of the packet.

12. The network device according to claim 8, wherein the congestion control message further carries information that indicates a congestion degree.

13. The network device according to claim 12, wherein the information that indicates the congestion degree comprises one or more pieces of the following information: a congestion point identifier, a current quantity of available bytes of a congestion point sending queue, or a difference between two quantities of available bytes of a congestion point sending queue.

14. The network device according to claim 12, wherein the information that indicates the congestion degree comprises a quantized feedback value of the congestion control message.

* * * * *